United States Patent
Wuillemin

(10) Patent No.: US 9,627,698 B2
(45) Date of Patent: Apr. 18, 2017

(54) GAS DISTRIBUTION ELEMENT FOR A FUEL CELL

(71) Applicant: HTCERAMIX S.A., Yverdon-les-Bains (CH)

(72) Inventor: Zacharie Wuillemin, Epesses (CH)

(73) Assignee: HTCERAMIX S.A., Yverdon-les-Bains (CH)

( * ) Notice: Subject to any disclaimer, the term of this patent is extended or adjusted under 35 U.S.C. 154(b) by 78 days.

(21) Appl. No.: 14/407,358

(22) PCT Filed: Jun. 11, 2013

(86) PCT No.: PCT/EP2013/062056
§ 371 (c)(1),
(2) Date: Dec. 11, 2014

(87) PCT Pub. No.: WO2013/186226
PCT Pub. Date: Dec. 19, 2013

(65) Prior Publication Data
US 2015/0180061 A1    Jun. 25, 2015

(30) Foreign Application Priority Data

Jun. 11, 2012   (EP) .................................... 12171563

(51) Int. Cl.
*H01M 8/04*  (2016.01)
*H01M 8/04082*  (2016.01)
(Continued)

(52) U.S. Cl.
CPC ......... *H01M 8/04201* (2013.01); *C25B 15/08* (2013.01); *H01M 8/0247* (2013.01);
(Continued)

(58) Field of Classification Search
CPC ........... C25B 1/08; C25B 9/203; C25B 15/08; H01M 8/0247; H01M 8/0254;
(Continued)

(56) References Cited

U.S. PATENT DOCUMENTS 6,099,984 A  *  8/2000  Rock ................... H01M 8/0247
                                                           429/492
6,492,053 B1  12/2002  Donelson et al.
(Continued)

FOREIGN PATENT DOCUMENTS

CN       1469500     1/2004
DE    102008043873   5/2010
(Continued)

OTHER PUBLICATIONS

International Search Report for PCT/EP2013/062056, Completed by the European Patent Office on Sep. 16, 2013, 4 Pages.
(Continued)

*Primary Examiner* — Charles Bushey
(74) *Attorney, Agent, or Firm* — Brooks Kushman P.C.

(57) ABSTRACT

The gas distribution element for a fuel cell or an electrolyzing device including a first layer and a second layer, the first and second layers are disposed with a gas distribution structure forming a pattern for a fluid flow of a first reactant fluid. The second layer is a homogenizing element, which has first apertures, wherein at least some of the first apertures have a length and a width, with the length being greater than the width and the length extending in a transverse direction to the main direction of fluid flow.

12 Claims, 14 Drawing Sheets

(51) Int. Cl.
*H01M 8/0247* (2016.01)
*H01M 8/0258* (2016.01)
*H01M 8/0254* (2016.01)
*C25B 15/08* (2006.01)
*H01M 8/04014* (2016.01)
*H01M 8/1246* (2016.01)
*C25B 1/08* (2006.01)
*C25B 9/20* (2006.01)
*H01M 8/2425* (2016.01)
*H01M 8/124* (2016.01)

(52) U.S. Cl.
CPC ....... *H01M 8/0254* (2013.01); *H01M 8/0258* (2013.01); *H01M 8/04014* (2013.01); *H01M 8/1246* (2013.01); *C25B 1/08* (2013.01); *C25B 9/203* (2013.01); *H01M 8/2425* (2013.01); *H01M 2008/1293* (2013.01); *Y02E 60/366* (2013.01)

(58) Field of Classification Search
CPC ........... H01M 8/0258; H01M 8/04014; H01M 8/04201; H01M 8/1246; H01M 8/2425; H01M 2008/1293; Y02E 60/366; Y02E 60/50; Y02E 60/525
USPC ................................................. 261/102, 105
See application file for complete search history.

(56) References Cited

U.S. PATENT DOCUMENTS

| | | | |
|---|---|---|---|
| 6,670,068 B1 | 12/2003 | Diez | |
| 7,112,385 B2* | 9/2006 | Rock | H01M 8/0247 |
| | | | 429/446 |
| 7,348,093 B2 | 3/2008 | Danzer et al. | |
| 7,632,586 B2 | 12/2009 | Ihringer et al. | |
| 8,501,362 B2* | 8/2013 | Amemiya | H01M 8/0258 |
| | | | 429/429 |
| 8,614,029 B2 | 12/2013 | Daremas et al. | |
| 2003/0175577 A1* | 9/2003 | Rock | H01M 8/0228 |
| | | | 429/480 |
| 2004/0151975 A1 | 8/2004 | Allen | |
| 2004/0157103 A1* | 8/2004 | Takeguchi | H01M 8/0258 |
| | | | 429/413 |
| 2004/0209140 A1 | 10/2004 | Okazaki et al. | |
| 2005/0008912 A1 | 1/2005 | Yang et al. | |
| 2005/0037935 A1* | 2/2005 | Abd Elhamid | C11D 7/10 |
| | | | 510/175 |
| 2005/0186464 A1 | 8/2005 | Sugiura et al. | |
| 2006/0147787 A1 | 7/2006 | Yamauchi et al. | |
| 2007/0048591 A1 | 3/2007 | Dong et al. | |
| 2008/0193812 A1 | 8/2008 | Murata et al. | |
| 2008/0280177 A1 | 11/2008 | Ose et al. | |
| 2010/0099001 A1* | 4/2010 | Owejan | H01M 8/0247 |
| | | | 429/514 |
| 2011/0136033 A1* | 6/2011 | Chen | H01M 8/0254 |
| | | | 429/457 |
| 2011/0207022 A1 | 8/2011 | Wieser et al. | |
| 2011/0269048 A1 | 11/2011 | Reinert | |
| 2015/0132677 A1* | 5/2015 | Wuillemin | H01M 8/2425 |
| | | | 429/446 |
| 2015/0176140 A1* | 6/2015 | Wuillemin | C25B 1/08 |
| | | | 429/434 |

FOREIGN PATENT DOCUMENTS

| | | |
|---|---|---|
| EP | 1286404 | 2/2003 |
| EP | 1498967 | 1/2005 |
| EP | 1742285 | 1/2007 |
| EP | 1830426 | 9/2007 |
| EP | 1864347 | 11/2009 |
| EP | 2267829 | 12/2010 |
| WO | 9634421 | 10/1996 |
| WO | 0191218 | 11/2001 |
| WO | 2004021488 | 3/2004 |
| WO | 2006048429 | 5/2006 |
| WO | 2009142994 | 11/2009 |

OTHER PUBLICATIONS

Cornu et al. Fuel Cells 2011, vol. 11, No. 4, p. 553-564, "Impact of Random Geometric Distortions on the Perfromance and Reliability of an SOFC."

* cited by examiner

GAS DISTRIBUTION ELEMENT FOR A FUEL CELL

CROSS-REFERENCE TO RELATED APPLICATION

This application is the U.S. national phase of PCT Application No. PCT/EP2013/062056 filed on Jun. 11, 2013, which claims priority to EP Patent Application No. 12171563.5 filed on Jun. 11, 2012, the disclosures of which are incorporated in their entirety by reference herein.

TECHNICAL FIELD

The invention concerns a gas distribution element for a fuel cell or an electrolyzing device, in particular a gas distribution element for distributing a reactant fluid onto an electrode of the fuel cell or the electrolyzing device.

BACKGROUND OF THE INVENTION

Fuel cells are electrochemical devices for converting chemical energy stored in fuels directly into electrical energy by performing an electrochemical reaction. In most cases oxygen or oxygen ions react with hydrogen, CO or other fuels, thereby generating a flow of electrons and consequently providing an electric current as well as heat.

The reaction employs a reducing agent and an oxidant as reactants, which are to be continuously fed to the fuel cell, typically the hydrogen is used as a reducing agent and oxygen or air containing such oxygen is used as an oxidant.

In most cases, a fuel cell can be used reversely to perform an electrolysis reaction, where an electrical current and possibly also heat have to be provided. For the sake of simplicity, only the fuel cell operation mode is described below.

A fuel cell power system in general comprises the following components: one or several fuel cell stacks, as well as auxiliary equipment also referred to as balance of plant. The fuel cell stack is made of individual repeating-units, which are modularly combined and electrically connected. The individual repeating-units contain one or several cell membranes, in which the electrochemical reactions as mentioned above, take place. The repeating-units contain also components to feed the reactants, allowing electrical contacting or sealing, etc.

The auxiliary equipment provides the conditioning of the feed streams, thus providing air or oxygen and the fuel at the correct temperature and pressure conditions as well as an optional fuel processor or fuel reformer. Furthermore the auxiliary equipment may include heat exchangers for the correct operating temperature of the fuel cell stack and for making use of the thermal energy generated by the electrochemical reactions to preheat fuel or oxidant feed streams, and to deliver useful heat to the user. An example for such a heat exchanger is disclosed in WO2006/048429 A1.

The auxiliary equipment may also include electrical energy management systems.

A cell membrane usually consists of an electrolyte in contact with an anode and a cathode on either side thereof. The electrolyte is an ionic conductor, but electric insulator. In operation as fuel cell, a fuel is fed continuously to the anode, thus the negative electrode and an oxidant is fed continuously to the cathode, thus the positive electrode. The electrochemical reactions take place at the electrodes to produce an ionic current through the electrolyte as soon as an electric current is allowed to flow from/to the respective electrodes through an external circuit, hence allowing performing a work on a load.

The unit cells comprising the cell membranes as mentioned above can have different shapes, such as plates or tubular structures. Each cell membrane has to be contacted electrically. In addition, the reactant gases have to be properly distributed over the surface of the electrodes to maximize the efficiency of the reaction. This is achieved for instance by creating gas distribution layers of specific geometry in contact with the surface of the electrodes. Both the electrical conduction and gas distribution are therefore often combined in specific parts. Together with the cell membranes and additional individual components, this sub-assembly represents one repeating-unit of the fuel cell stack.

For planar cell membranes, the individual repeating-units are most often placed on top of each other to form a stack.

In this case, in the repeating-units the gas distribution layers are used not only to transport the reactants to the electrodes, but also to conduct the electrical current from one electrode of a first cell membrane to the second electrode of another cell membrane, thereby connecting several cells in series.

In a unit cell, the dense electrolyte provides a physical barrier to prevent the fuel and oxidant gas streams from mixing directly. In planar stacks, bipolar plates usually ensure the same separation of gases between adjacent repeating-units, providing also the electrical contacting through the gas distribution layers.

A large number of catalyst sites are to be provided at the interfaces between the electrolyte layer and the electrodes, thus a zone which has mixed conductivity for electrons and ions. The performance of the fuel cell membranes has been continuously improved by efforts to increase the conductivity of the electrolyte, developing improved electrode catalytic activities and reactant transport, and broadening the temperature range over which the cells can be operated.

The electrodes are typically porous and are made of an electrically and possibly also ionically conductive material. At low temperatures, only a few relatively rare and expensive materials provide sufficient electro-catalytic activity, thus in these cases catalysts are deposited in small quantities at the interface between the porous electrode and the electrolyte. In high temperature fuel cells, a larger number of materials qualify for an electrode material thanks to their improved electro-catalytic activity.

The porous electrodes thus have the primary function of providing a surface for the electrochemical reactions to take place. In addition, their function is to conduct electrons away from or into the three-phase interface and provide current collection and connection with either other cells or the load.

While the performance of the cell membranes is principally dictated by the choice of materials, their size or microstructure and the way they are combined together, the performance of a fuel cell stack depends to a very important extent also on the quality of the distribution of reactants over the cell membranes, the electrical contacting of the electrodes, and the homogeneity of reactant flows and of temperatures among the different repeating-units. Last but not least, the choice of the fuel processing and of the operating points has an important impact on the performance and the lifetime of the fuel cell.

A variety of fuel cells has been developed and is currently under various stages of commercialization. The most common classification of fuel cells relates to the type of electrolyte used, such as solid oxide fuel cells (SOFC), polymer electrolyte fuel cells (PEFC), alkaline fuel cells (AFC), phosphoric acid fuel cells (PAFC) or molten carbonate fuel cells (MCFC).

A polymer electrolyte fuel cell (PEFC) has an electrode which is configured as an ion exchange membrane, in particular a fluorinated sulfonic acid polymer, which has the characteristic of being a good proton conductor. The only liquid present in the fuel cell is water, as the fuel is mostly a hydrocarbon fuel providing the hydrogen ions and the oxidant is air providing the oxygen for performing the electrochemical reaction. The operation temperature is usually less than 100° C. as the membrane must be hydrated by water and such water should therefore not evaporate faster than it is formed. Thus preferably the operating temperature is around 60° C. to 80° C. Typically carbon electrodes with a platinum electro-catalyst are used both for the anode and the cathode. The bipolar or separator plates are either made of carbon or metal. The fuel should not contain any CO as the anode is easily poisoned by traces of CO. An important commercial application for PEFC is fuel cell vehicles, as well as electrolyzers.

An alkaline fuel cell (AFC) has a KOH electrolyte, which is retained in a matrix, e.g. made of asbestos and a wide range of electro-catalysts can be used, e.g. Ni, Ag, metal oxides, spinels, noble metals. It is $OH^-$ ions that are the charge carriers across the electrolyte.

The operation temperature is usually about 250° C. if a KOH of a concentration of about 85 weight % is used and may be lower than 120° C. if a KOH of a concentration of 35% to 50% is used. The fuel may not contain any CO nor any $CO_2$, which would react with the electrolyte to $K_2CO_3$, thereby altering it. Thus preferably pure hydrogen is used as a fuel for an AFC. Typically electrodes composed of transition metals are used with a platinum electro-catalyst are used both for the anode and the cathode; the bipolar plates are made of metal.

A phosphoric acid fuel cell (PAFC) uses highly concentrated phosphoric acid as the electrolyte which is retained in a matrix, e.g. made of silicon carbide and mostly platinum is used as an electro-catalysts. The ions transported in the electrolyte are protons. The typical operating temperature of a PAFC lies between 150° C. and 220° C. due to the fact that the concentrated phosphoric acid has a high stability even under these comparatively high temperatures. At lower temperatures, phosphoric acid is a poor ionic conductor and CO poisoning of the platinum electro-catalyst occurs. At the higher operating temperatures a content of up to 1% of CO as diluent is acceptable. Typically electrodes composed of carbon are used both for the anode and the cathode; the bipolar plates are made of graphite. Due to the corrosive nature of phosphoric acid, expensive materials such as graphite have to be used. The main field of use of PAFC is stationary applications.

A molten carbonate fuel cell (MCFC) uses a combination of alkali carbonates as the electrolyte, which is retained in a matrix of $LiAlO_2$. The typical operating temperature of a MCFC is about 600° C. and 700° C. where the alkali carbonates form a highly conductive molten salt, with carbonate ions providing ionic conduction. The anode usually consists of nickel and the cathode of nickel oxide, the interconnects are made of stainless steel or nickel. The nickel/nickel oxide electrodes provide sufficient activity at the high operating temperature, thus an electro-catalyst is not needed. The fuel can comprise CO and hydrocarbons; furthermore a source of $CO_2$ is required at the cathode, which can be provided by the exhaust from the anode. The main field of use of MCFC is stationary applications.

A solid oxide fuel cell (SOFC) uses a solid electrolyte, which is a non-porous metal oxide, such as 3%-10% yttria-stabilized zirconia (YSZ) that is $ZrO_2$ stabilized by $Y_2O_3$, or $Sm_2O_3$-doped $CeO_2$ (SDC) or $GdO_2$-doped $CeO_2$ (GDC). The typical operating temperature of a SOFC depends on the electrolyte material and is about 500° C. up to 1100° C. with oxygen ions providing ionic conduction. The anode and the cathode usually include also ceramic materials. The fuel electrode is usually made of a combination of metal and a ceramic forming a cermet, e.g. mostly Ni-YSZ cermets. The oxygen electrode usually comprises an electrically conductive doped perovskite or a combination of a perovskite and an ionic conductive ceramic such as YSZ or GDC. Typical perovskites used as cathode contain a combination of La, Sr, Co, Fe, Mn.

The bipolar plates are usually made of stainless steel.

Further information on possible components for cathode, anode and electrolyte as well as optional intermediate layers and catalysts can be found in U.S. Pat. No. 7,632,586 B2 incorporated by reference.

The fuel can comprise next to hydrogen CO and other hydrocarbons, such as methane or ammonia, whereas only $H_2$ and CO are easily converted electrochemically. The other fuels are consumed indirectly or require a dissociation step before being converted. Furthermore, a SOFC can tolerate a fuel that is diluted by inert gases such as $N_2$, $CO_2$ or steam. Amongst the hydrocarbons, it can be natural gas, gasoline, diesel or also biogas. This type of fuel cell remains however sensitive to some poisoning elements contained in the fuels, such as sulphur, in particular $H_2S$ and COS that are considered as a poison already in a concentration of above 1 ppm.

The cathode-anode-electrolyte unit of the cell membrane is constructed with two porous electrodes that sandwich the electrolyte. Air flows along the cathode, thus transporting oxygen molecules to the cathode. When an oxygen molecule contacts the cathode/electrolyte interface it acquires electrons from the cathode. The oxygen ions diffuse into the electrolyte material and migrate to the other side of the cell where they contact the anode. The oxygen ions encounter the fuel at the anode/electrolyte interface and react catalytically, whereby water, carbon dioxide, heat and electrons are produced. The electrons are fed into the external circuit for providing electrical energy.

The main field of use of SOFC is stationary applications, such as stationary power generation, mobile power, auxiliary power for vehicles, specialty applications. The power densities usually attained by SOFCs are in the range of 200 to 500 $mW/cm^2$ for stationary applications.

The SOFC is the fuel cell having undergone the longest continuous development period, starting in the late 1950's. Due to the fact that a solid electrolyte is foreseen, the cell membrane can be formed into a variety of shapes, such as tubular, planar or monolithic shapes. The electrical efficiencies depend largely on the used fuel. Using hydrogen as fuel, electrical efficiencies in the range of 45%-55% (LHV) can be achieved, with maxima close to 60% at the level of a repeating-unit. Using methane as fuel, system electrical efficiencies of 60% can be attained for stack electrical efficiencies close to 70%. Furthermore the emissions of acid gas or any solids are negligible.

An arrangement of a solid oxide fuel cell system for generating electric power by combination of oxygen with a reactive gas, i.e. a fuel gas is disclosed in WO2006/048429. The solid oxide fuel cell includes a stack configuration comprising an electrolyte layer sandwiched between two electrodes. One of the electrodes is in operation in contact with oxygen or air, the other electrode is in contact with a fuel gas at an operating temperature of about 500° C. to about 1100° C. Usually a support layer is used during the production of the cell to contain the electrode layer and to provide additional mechanical stability of the cells. The support layer may also function as a current collector.

The cathode comprises a perovskite, a lanthanum or strontium manganite or an yttria stabilized zirconia. Oxygen ions are formed from the oxygen gas provided at the cathode, which migrate through the electrolyte layer to combine with the hydrogen gas provided at the anode. The anode comprises nickel and/or yttria stabilized zirconia. At the anode, water is formed and electrons are provided, which are collected in the current collector.

One characteristic of fuel cell systems is that their efficiency is nearly unaffected by size. This means, that small, relatively high efficient power plants can be developed starting from a few kW for domestic cogeneration units to low MW capacity power plants.

A problem associated with fuel cells in general is the fact that a single cell membrane does generate a DC potential in the order of 1V, which is too small to be used for residential or automotive applications. For this reason, a plurality of cell membranes is combined to a stack of cell membranes connected electrically in series as to provide a voltage of sufficient magnitude to be converted efficiently to AC current and employed in most commercial applications.

Usual stacks are made of a few tens to a few hundreds of cell membranes connected partly in series and in parallel, with some designs including even a few thousands of cells.

The assembly of a stack of repeat-units should therefore at one hand require as few assembly steps as possible and on the other hand guarantee proper operating conditions for each of the cell membranes.

Due to the connection of repeat-units in series, any performance limitation on one single cell membrane may have important consequences on the overall performance of the stack, as it can limit the overall current that can be driven and therefore the resulting electrical power.

The stack construction depends on the type of cell membranes that are used. The first main class of stacks uses tubular cell membranes such as presented in WO01/91218 A2.

The second class of stacks uses planar cell membranes that can be interconnected by piling up. Among them, principal differences concern the type and geometry of fuel and oxidant supply, or the design of gas distribution over the electrodes and their electrical contacting.

A first concept which has been proposed e.g. in EP 1 864 347 B1 is a stack of cylindrical shape. Thus the cell membrane is a disk-shaped ceramic three layer membrane consisting of a positive electrode, an electrolyte and a negative electrode (CAE unit). The fuel is supplied in a central channel and directed radially outwardly and an oxygen containing gas is supplied from the periphery and directed toward the central channel.

In US2011/0269048A1, a stack concept based on rectangular cell membranes is shown, where said membranes are attached to a gas distribution unit presenting fuel inlet and outlet ports, and where the oxidant is supplied and extracted at the periphery of said gas distribution unit. In order to improve gas distribution of the gas flowing across the surface of the cell membrane the gas channels are curved. Previously, the tubular manifolds at the gas entry and exit section of the cell membrane have presented an obstacle to gas flow, which has resulted in an inhomogeneous flow field of the gas flowing across the cell membrane. According to US2011/0269048A1 curved gas channels are suggested, which guide the gas around the obstacles to the regions behind the obstacles. Thereby a more even distribution of gas flow can be obtained and the negative impact of the obstacles on gas flow be compensated.

The reactant supply and discharge of the solution presented in EP 1 864 347 B1 require according to U.S. Pat. No. 7,632,586 B2 a relative complicated manufacturing procedure for the interconnecting plates. To avoid this, the planar CAE units are positioned one above the other with interconnecting layers formed as planar metal plates arranged in between neighboring CAE units. The respective passages for fuel and oxidant are formed in the anode and cathode layers.

Furthermore the effects of expansion of the CAE unit and the structures for supplying the CAE unit with the reactants and conducting the reactants away therefrom have to be taken into account.

Moreover, the electrodes and interfaces tend to degrade as soon as excessive temperatures are reached.

Due to the exothermic reaction, an active cooling of the unit cells is therefore required, which can be principally achieved by air cooling. To limit temperature gradients and excessive temperature differences in the CAE unit and in the gas distribution structures, a proper distribution of the cooling air in the unit cell is required. To limit temperature differences, a large excess of cooling air is required with respect to the amount that would be necessary for the electrochemical reaction itself. This excess air implies additional losses in the balance of plant, in particular due to the consumption of the air blowers. These losses can however be reduced if the pressure drop in the stack is low, that means, if the gas distribution structure for the air in the stack presents a low resistance to the air flow.

An additional drawback of the use of excess air is the transport of poisoning species onto the air electrode. Especially volatile chromium is known to be released by the metallic components situated upstream of the stack and transported into the stack by the air stream. The volatile chromium tends to deposit in the air electrodes by electrochemical and chemical reactions. In particular, volatile chromium reacts spontaneously with the strontium contained in the electrodes. Moreover, it can be deposited electrochemically as chromium oxide at the electrode/electrode interface, hence reducing the number of reacting sites. Not only chromium, but also silicon, sulfur and other species are known to further affect the durability of the air electrode.

A problem associated with fuel cell stacks of the prior art is local temperature peaks developing on the surface of an electrode, which usually forms a planar layer.

If such local temperature peaks occur, the reaction kinetics may be altered and a local hot spot may be formed. Such a hot spot is undesired because it involves a high strain on the materials, by causing a local thermal expansion, which may lead to warpage or deformations of the layer materials affected. Due to the fact that the ceramics materials of the electrodes or the electrolyte are brittle, they may be subject to cracks and eventually break if subjected to substantial local temperature variations.

The occurrence of such hotspot can be drastically reduced by increasing the cooling air flow, and by proper design of the air distribution structure that contacts the CAE unit and hence can serve as heat dissipating structure.

The effect of thermal strain can further be mitigated in principle by a stack having a similar configuration as shown in U.S. Pat. No. 6,670,068 B1. Thus a plurality of CAE units are in electrically conductive contact with a contact plate and a fluid guiding element is formed as shaped sheet metal part and connected to the contact plate in a fluid-tight manner by welding or soldering. Thereby the contact plate defines a fluid chamber having a combustible gas or an oxidizing agent flowing through it during operation of the fuel cell unit. The shaped sheet metal part is disposed with a plurality of corrugations giving it a wave-like structure. The wave-like structure as such may compensate for some of the thermal expansion of the CAE unit and of the fluid guiding element in operation. However due to the local contact of the wave peaks or wave troughs with the respective electrode, the fluid guiding element has to follow the thermal expansion of the electrode. If the fluid guiding element does not have sufficient elasticity the strain due to thermal expansion is introduced into the electrode. The electrodes are formed from solid, brittle ceramics. Thus, if a high strain is introduced into the electrodes, cracks may be formed, which will ultimately destroy the electrode. In addition the welding or soldering connection provided between the fluid guiding element and the anode also contributes to the stiffness of the construction. In particular if materials having a different coefficient of thermal expansions are used, the strains may finally lead to damages of the electrode and may damage the cell membrane concerned. In particular the flow of reactants may be altered or direct mixing of them can occur if the cell membrane is broken, leading to spontaneous combustion. Thus locally hot spots may form, which may induce local thermal expansion and thus further development of local stress.

An additional solution for mitigating the effects of thermal strain and thermal expansion is provided in WO2004/021488. This solution foresees a frame of a first and a second foil-like element enclosing a fuel passage. A CAE unit is attached to the first of the foil-like elements with the anode being arranged immediately adjacent to the first foil like element on the opposite side of the fuel passage. The fuel reaches the anode by traversing the first foil-like element, which is disposed with perforations for this purpose. The second foil like element is fluid-tight and serves as a separating element to separate fuel flow from the flow of the oxide containing gas, such as air. A good electrical contact is ensured by providing a wire mesh in the fuel passage and by providing a further wire mesh on the second foil like element on the side opposite of the fuel passage. The supporting structure of WO2004/021488 can thus expand quite freely, and the close bonding of the CAE unit to the foil-like elements plays a role of a heat dissipating structure.

Documents EP1742285A1, WO96/34421, US2008/0280177A1 and EP1830426A1 disclose gas distribution elements. One disadvantage of such gas distribution elements is that the distribution of the gas is not homogenous, so that a lack of fuel may occur on certain areas on the cathode-anode-electrolyte unit, and the risk of local overheating increases.

Thus it is an object of the invention to improve existing fuel cells, to make them more reliable, and to allow cheaper manufacturing.

SUMMARY OF THE INVENTION

The object of the invention is obtained by a gas distribution element for a fuel cell or an electrolyzing device having an increased performance, in particular by a solid oxide fuel cell, further referred to as SOFC or solid oxide electrolyzing device, further referred to as SOEC having a gas distribution element. In particular the invention allows providing a homogeneous distribution of reactive gas onto the negative fuel electrode, which is advantageous for the performance of the fuel cell, in particular a SOFC or SOEC. Moreover, it improves the temperature distribution on the electrode and consequently on the unit cell comprising a cathode-electrolyte-anode unit.

The gas distribution element for a fuel cell or an electrolyzing device enables the appropriate distribution of the reactive gas on the fuel electrode of the fuel cell as well as proper electrical contact with the latter. This invention thus concerns the gas distribution element and its construction in a fuel cell or electrolyzing device stack.

The fuel cell is usually configured as a fuel cell stack composed of a plurality of unit cells. Thus the unit cells are combined in a modular fashion into such a fuel cell stack as to achieve the voltage and power output level required for the application. The stacking thus involves connecting multiple unit cells in series via electrically conductive interconnects or bipolar plates.

Thus, the gas distribution element for a fuel cell, in particular a solid oxide fuel cell, or an electrolyzing device comprises a first layer and a second layer, said first and second layers being disposed with a gas distribution structure forming a pattern for a fluid flow for a first reactant fluid, and eventually a second reactant fluid.

The second layer is a homogenizing element, which has first apertures wherein at least some of the first apertures have a length and a width, with the length being greater than the width and the length extending in a transverse direction to the main direction of fluid flow. Thus said pattern comprises in particular a plurality of channels wherein the second layer contains apertures, which have a length extending transversely to the main direction of flow. The gas distribution structure also comprises apertures, which form a pattern of channel structures or a channel system.

If the expression "or" is used in this application for combining two alternatives, both the combination of both alternatives as well as the presence of only one of the alternatives is to be understood. If it is not specifically referred to a fuel cell, the features may be applied to either fuel cells or electrolyzing devices.

If the gas distribution element is operated in a fuel cell, the first electrode is a cathode and the second electrode is an anode and the reactant fluid flow is directed to the cathode. For fuel cells or electrolyzing devices a plurality of reactant fluids can be employed, at least a first reactant fluid and a second reactant fluid. The first reactant fluid is the fluid that can react with $O_2$ in an exothermic reaction in the fuel cell operation mode or can be dissociated in an endothermic reaction while forming $O_2$ in the electrolysis mode. It is typically any mixture of $H_2$, $N_2$, $H_2O$, $CO$, $CO_2$, ammonia, $CH_4$ and any other hydrocarbon gases. Depending on the operation as fuel cell or electrolyzing device and on the type of fuel cell, the gas mixture is varied. The second reactant fluid is $O_2$-containing gas, preferably air. In the case of an electrolysis device, it has to be noted that an external supply of this $O_2$-containing gas is not necessarily required.

For a solid oxide fuel cell or an electrolyzing device it is essential that the reactant fluid is homogeneously distributed onto and spread over the corresponding electrode in order to maximize its efficiency and guarantee a reliable operation. In practice, this requires that the gas distribution structure formed as a channel system or porous structure presents a homogeneous resistance to gas flow, thus an even pressure drop. For the channel system, this requires usually a very precise geometry, involving very tight fabrication tolerances and incurring therefore high costs.

The homogenizing element may comprise second apertures. In particular, the second apertures have a length and a width, with the length being greater than the width and the width extending in a transverse direction to the main direction of fluid. These first or second apertures can form channel-like structures, which are arranged in particular rectangular or inclined to the channels arranged in the first layer. This has the advantage, that the fluid flowing inside the gas distribution structure forming in particular an aperture in the first layer may be directed by a gas distribution structure arranged on the first layer towards the aperture of the second layer. The apertures of the first and second layers provide a pathway for the fluid and thus a fluid passage is formed over or across the gas distribution structure. Whenever the respective reactant fluid flows over or across the gas distribution structure of the first layer it enters the aperture of the second layer above the gas distribution structure of the first layer, i.e., it enters the aperture of the second layer above the gas distribution structure of the first layer and is distributed into a channel in the first layer continuing behind such a gas distribution structure and the neighboring apertures of the first layer due to the fact that first apertures are foreseen which have a length and a width and their length being larger than their width and their length extending in a transverse direction to the main direction of fluid flow.

The first or second apertures in the second layer can be in particular formed as holes, which have rectangular, square or round cross-sections. The gas distribution structure forms a pattern for the fluid flow of the first layer which can comprise at least one of channels, interrupted channels, three-dimensional structures, in particular protrusions, such as pins, grid structures or foam structures, such as continuous or interrupted foam structures. These structures can be manufactured from solid or porous metal or conducting ceramics. Advantageously a channel structure consisting of a single sheet or a pair of sheets is foreseen, which forms a gas distribution element together with the second layer or homogenizing layer.

An electrical contact between the different layers of the gas distribution element is obtainable by mechanical contact, welding, brazing or thin contact layers.

Each of the first or second layers can serve either as a cathode or an anode. Their function may be reversed depending on the nature of the electrolyte or the operation of the gas distribution element for a fuel cell or an electrolyzing device. A first reactant is rich in oxygen, for instance air. A second reactant contains at least one of the elements $H_2$, CO, $CO_2$, $H_2O$, ammonia or carbon containing gases.

A third layer may be provided, which is in particular a base layer. In addition a supporting layer may be provided, which is in particular used as a gas distribution layer for the oxygen electrode.

The gas distribution element has the following advantages: The homogenizing element allows to correct geometrical defects present in the gas distribution structure of the first layer. Therefore, low-cost production processes are applicable for the first and second layers, while maintaining a high quality of the gas distribution. In addition, stacks can be produced in different configurations with various footprints. The fuel cell system or the electrolyzing device can be adapted to a variety of uses depending on need. Under footprint, the overall length and width dimensions of the basement of the fuel cell stack is understood.

In an embodiment, 65% electrical efficiency based on the lower heating value of fuel was obtained on a stack module in a test at the Swiss Federal Institute of Technology (EPFL). The stack was fueled with steam reformed methane (steam-to-carbon ratio of 2) and was operated at 750° C. with a power density of 250 mW/cm$^2$.

With such efficiencies, the distributed generation of electricity in kW-sized units using SOFC technology is more efficient than centralized generation in MW-size plants using the best available combined cycle gas turbine (CCGT).

The ceramic gas diffusion layer which is placed on either side of the solid oxide fuel cell which, in turn, is sandwiched between two metallic interconnects reduces the cost of the overall stack by making it less complex and less expensive to manufacture as far as materials are concerned.

Thus the units are used as an alternative source of electrical energy for supplying electricity to houses which involves at least a 0.5 kW stack and preferably a 2.5 kW stack.

According to an embodiment, the gas distribution structure of the first layer is at least partially obstructed by at least a bar element. The bar element is to be considered as an obstacle to the fluid flow through the gas distribution structure of the first layer. The bar element can be any type of barrier or throttle element, which forces the fluid flow to deviate from proceeding in the main direction of fluid flow, or that creates a local restriction of the hydraulic diameter of the flow channels.

At least some of the first or the second apertures of the second layer can be shaped as perforations, in particular as holes. The first and second layers thus form a gas distribution element, which is composed of at least one sheet metal. In the gas distribution element, the at least one sheet metal layer forms a channel structure facing the perforated layer. The particularity of the perforated layer is to present a series of elongated holes extending substantially perpendicular to the fuel distribution channels and allowing mixing the gas of several channels in the near environment at regular intervals along the flow direction.

Advantageously the length of the perforations is greater than the width of the bar element. Either the first or second reactant fluid can thus pass over the obstacle formed by the bar element and therefore the flow deviates from the main direction of flow allowing for a mixing of the stream through one channel with streams passing through adjacent channels. According to an embodiment, a portion of the apertures, in particular shaped as perforations, has a length greater than the width and either the length or the width extends in the main direction of fluid flow. In particular the width of the first apertures extends in the main direction of fluid flow or the length of the second apertures extends in the main direction of fluid flow. The gas distribution structure arranged on the first layer and the and at least one the first apertures and second apertures are in fluid contact.

A supporting layer, forming an additional layer, can be provided for an even distribution of either one of the first or second reactant fluids onto an electrode. According to an embodiment a plurality of inlet openings for the respective reactant fluid are provided on at least one of the first and second layers. By providing a plurality of inlet openings, a more even distribution of fluid flow can be obtained. A further advantage is the more even distribution of heat, thus allowing making efficient use of the entire reactive surface provided by the CAE unit.

Furthermore gas distribution structures forming the pattern for fluid flow, in particular at least some of the first or second apertures can be manufactured by stamping, or etching. According to an alternative embodiment, the supporting layer forms a monolithic piece with the first layer. According to an embodiment, the first layer comprises a first sheet containing perforations and a second sheet forming the base layer. The supporting layer can be arranged on the opposite side of the base layer or of the first layer.

Furthermore, the invention concerns fuel cell or an electrolyzing device comprising a gas distribution element according any one of the preceding embodiments.

In particular, the total open area of the first apertures is at least 20% of the total contact surface of the negative electrode of the cathode-anode-electrolyte unit, preferably at least about 30% of the total contact surface, most preferred at least about 50% of the total contact surface. Thereby a lateral distribution of the gas flowing through the gas distribution element is obtained, which allows for a more homogeneous fluid distribution and consequently of a more uniform fluid temperature.

A method for operating a gas distribution element for a fuel cell or an electrolyzing device comprises the following steps: a first reactant fluid flows along a first side of the gas distribution element, a second reactant fluid flows along a second side of the gas distribution element and the first or second reactant fluid provide reactants, charge-carrying ions and electrons to a cathode-anode-electrolyte unit on either side thereof, such that the charge-carrying ions can cross the electrolyte to perform an electrochemical reaction. The gas distribution element comprises a first layer and a second layer, said first and second layers are disposed with a gas distribution structure forming a pattern for a fluid flow, wherein the second layer is a homogenizing element, which has first apertures or second apertures which have a length and a width, with the length being greater than the width and the length of at least some of the first apertures extending in a transverse direction to the main direction of fluid flow such that the flow through the homogenizing element is evenly distributed over the surface of the second layer. Thus, the reactive surface corresponds largely with the surface of the gas distribution element and electrochemical reactions are carried out uniformly over the entire surface of the homogenizing element.

Primary applications for SOFCs are in the fields of remote power, distributed power generation, Combined Heat and Power (CHP), Auxiliary Power Units (APUs) for trucks, buses, and ships, portable power and efficient biogas conversion.

BRIEF DESCRIPTION OF THE DRAWINGS

These and other features and advantages of the invention will be more fully understood and appreciated from the following description of certain exemplary embodiments of the invention taken together with the accompanying drawings, in which like numerals represent like compounds. The invention is described in detail in combination with a fuel cell. It is obvious that the invention also covers an electrolyzing device.

DESCRIPTION OF THE PREFERRED EMBODIMENTS

Figure 1:
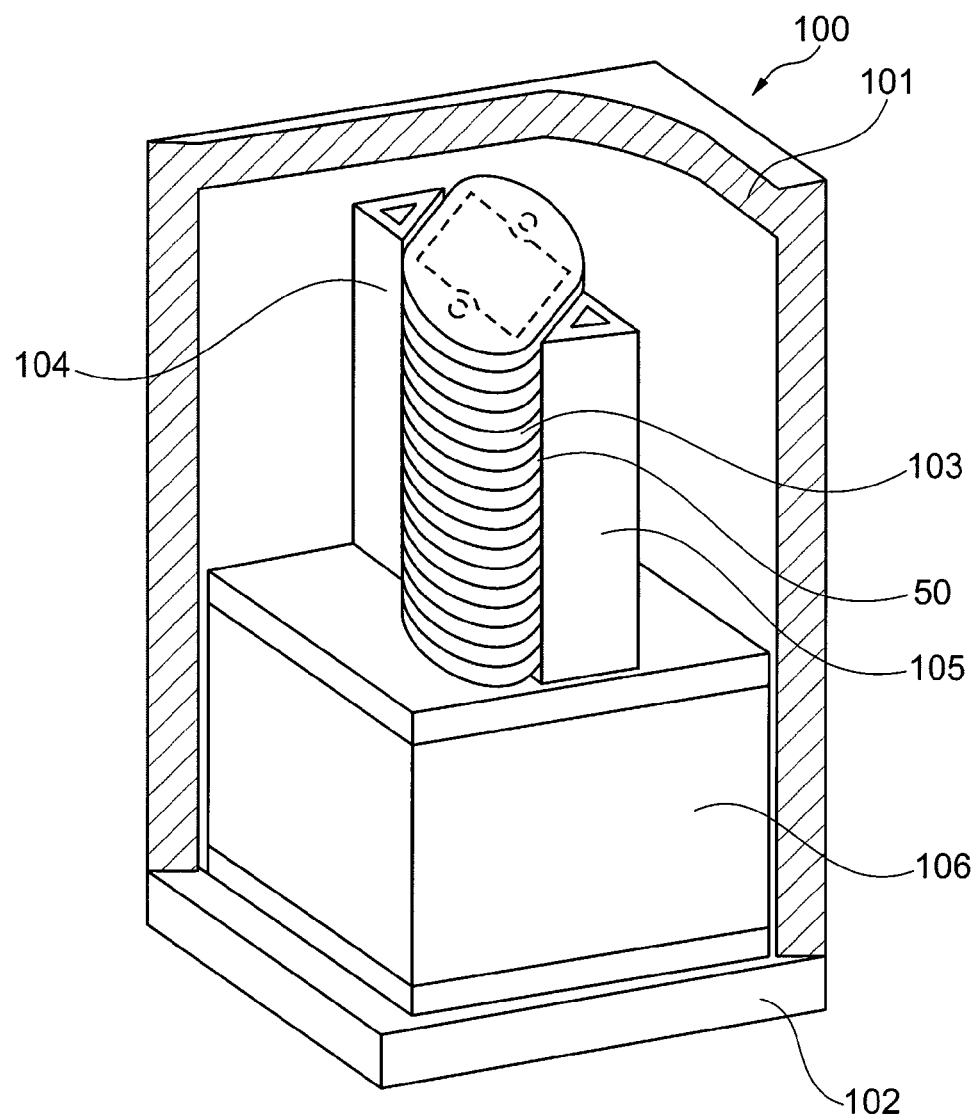
FIG. 1 is a schematic view of a SOFC system.

FIG. 1 shows a solid oxide fuel cell (SOFC) system 100 according to the invention. The solid oxide fuel cell system comprises a casing 101, which contains a fuel cell stack 103 being composed of a plurality of fuel cell units 50, whereby the fuel cell units are herein also termed unit cells 50. The casing rests on a basement 102. The fuel cell system or balance of plant includes a heat exchanger 106 for heating the reactants as well as reactant preparation units for providing the reactants in the correct composition and the correct flow rate to the fuel cell, which are not shown in the drawings. The stacks are disposed with reactant discharge elements 104, 105.

The stack can be configured as shown in U.S. Pat. No. 7,632,586 B2, where a particular electrode contacting and gas distribution structure is applied. In the prior art, a stack based on this technology has been developed for remote and micro-Combined Heat and Power (CHP) applications of about 1 kW. It is characterized by low pressure drops and can achieve power densities of 1 kW/l or 400 mW/cm$^2$ with electrical efficiencies of above 45%. The stacks can be fuelled with reformed natural gas, reformate gas or hydrogen. This stack manifolds the air externally and the fuel internally and recovers the fuel exhaust stream. The exhaust stream can be used in post combustion or recycled for reforming (given adapted balance of plant). The use of U.S. Pat. No. 7,632,586 B2 improves the thermal cycling tolerance of the stack, avoiding additional performance degradation due to thermal cycling.

With two recent prototypes combining the present invention with the technology disclosed U.S. Pat. No. 7,632,586 B2, an improved performance was measured. A maximum fuel conversion of 94% was attained with efficiencies reaching 61% using hydrogen as fuel and 69% using methane. Moreover, up to 50 thermal cycles were attained without significant damage on a short stack of that combined type. This is far above earlier results based on the sole handling of reactant flow as disclosed in U.S. Pat. No. 7,632,586 B2.

Figure 2:
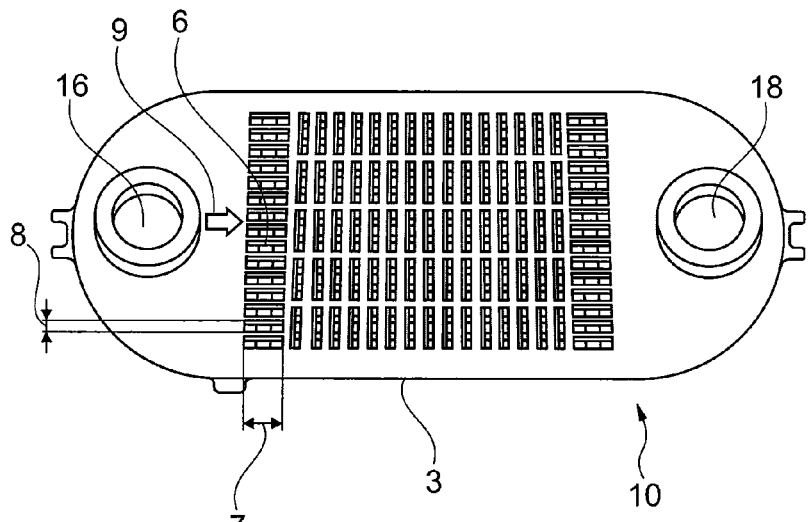
FIG. 2 is an isometric view on a gas distribution element according to a first embodiment of the invention, FIG. 3 a cross-sectional view of a unit cell according to a second embodiment of the invention, FIG. 4 an explosion view of a unit cell of a third embodiment of the invention, FIG. 4A an enlarged view of the supporting layer, FIG. 4B an explosion view of a further embodiment of a gas distribution element, FIG. 4C an explosion view of a further embodiment of a gas distribution element, FIG. 4D a further embodiment of a second layer, the homogenizing layer, FIG. 4E a further embodiment of a second layer, the homogenizing layer, FIG. 5 a partial top view of two neighboring layers of a gas distribution element, FIG. 6A a partial top view of a perforated layer of a gas distribution element, FIG. 6B a section along line A-A of FIG. 6A, FIG. 6C a section along line B-B of FIG. 6A, FIG. 6D an enlarged section of an ideal gas distribution element along line C-C of FIG. 4 but without the supporting layer, FIG. 6E a section of a gas distribution element without a homogenizing layer, FIG. 6F an enlarged section along line C-C of FIG. 4 of a gas distribution element comprising a homogenizing layer, FIG. 6G a schematic view showing ideal conditions of flow of a combustible gas through a gas distribution element, FIG. 6H a schematic view showing real conditions of flow of a combustible gas through a gas distribution element, FIG. 6I a schematic view showing real conditions of flow of a combustible gas through a further gas distribution element, FIG. 6K a section of a gas distribution element without a homogenizing layer, FIG. 6L a section of a similar gas distribution element as shown in FIG. 6K but the gas distribution element comprising a homogenizing layer, FIG. 7A a schematic view showing ideal conditions of flow of a combustible gas through a gas distribution layer of a fuel cell unit, FIG. 7B a schematic view showing optimal designed real conditions of flow of the combustible gas through a fuel cell unit, FIG. 7C a schematic view showing conditions of flow of the combustible gas through a fuel cell unit according to the prior art, FIG. 7D a view on a stack of fuel cell units with a flow according to conditions shown in FIG. 7B, FIG. 7E a view on a stack of fuel cell units with a flow according to conditions shown in FIG. 7C, FIG. 8 a section though a plurality of consecutive layers of fuel cell units of a stack, FIG. 8A a detailed section view of FIG. 8, FIG. 8B a section of a schematic side view of a fuel cell stack.

For the distribution of reactants a gas distribution element 10 is foreseen which is depicted in detail in FIG. 2. The gas distribution element is arranged between two neighboring cathode-anode electrolyte units 5. Under a unit cell 50, a unit being composed of a cathode-anode-electrolyte unit 5 and the gas distribution element 10 is to be understood.

The gas distribution element 10 is used for providing at least the combustible gas to the respective electrode.

In a further advantageous embodiment the gas distribution element 10 is also used for providing the reactant containing oxygen, which means the oxidizing agent, and a fuel, which means the combustible gas, to the respective electrode. In this embodiment the gas distribution element 10 is used for providing the first reactant fluid, which is rich in oxygen, and the second reactant fluid, which contains the fuel, to the respective electrode. The gas distribution element 10 disclosed in FIG. 2 comprises a fuel inlet 16 and a fuel outlet 18, so that the fuel provided by inlet 16 flows within the gas distribution element 10 in linear direction of flow 9 from the inlet 16, to the outlet 18. In FIG. 2 the first layer 2 is arranged below the second layer 3.

For the operation as a fuel cell unit 50, which herein is also termed unit cell 50, the reactant containing oxygen is supplied to the positive oxygen electrode 51 acting as a cathode.

For an operation of the unit cell 50 as an electrolyzing device, the reactant containing oxygen is supplied to the same positive oxygen electrode acting 51 as an anode In an advantageous embodiment the gas distribution element 10 is used for providing the reactant containing oxygen to the positive oxygen electrode 51 of the CAE cathode-anode-electrolyte unit 5 and a second reactant comprising the fuel to its negative electrode 53. Such a gas distribution element 10 preferably comprises a supporting layer, the supporting layer 4 comprising fluid conducting channels for the reactant containing oxygen.

In most cases the oxygen-containing reactant is air, however also pure oxygen or an oxygen containing gas may be supplied to the gas distribution element 10. The second reactant, the combustible gas, contains any mixture of $H_2$, CO, $H_2O$, $CO_2$, methane, ammonia, other hydrocarbons or optional diluents.

In a preferred embodiment, the second reactant (fuel) is distributed inside the gas distribution element 10. The negative electrode 53 of the CAE cathode-anode-electrolyte unit 5 is thus facing a second layer 3 of the gas distribution element 10.

The gas distribution element 10 can be foreseen for PEFC, AFC or MCFC fuel cell, thus its application is in no way limited to SOFC. The gas distribution element 10 can also be used for an electrolyzing device operating in the inverse way.

The gas distribution element 10 combines three essential functions of the fuel cell stack 103: it accomplishes current collection from the electrodes 51,53; it manifolds the reactant, in particular the fuel and preferably also the oxygen containing gas between and on the cells; and it comprises a base element 1 the purpose of which is to seal the reactant passages from each other and against the environment. The base element 1 is also termed bipolar plate.

The gas distribution element 10 thus allows to integrate the gas distribution of the unit cell 50, allowing the use of thin, not machined metallic sheets as shown by reference numbers 1,2,3 and/or 4, which for example may be manufactured by stamping, punching, embossing or etching, which means cheap manufacturing, instead of expensive, structured bi-polar plates. The base layer 1 and/or the first layer 2 and/or the second layer 3 and/or the supporting layer 4 can be manufactured by stamping, embossing, punching or etching or by hot pressing, such as graphite, molding, powder metallurgy. The gas distribution element 10 may be manufactures such that the base layer 1, the first layer 2, the second layer 3 or any combination thereof are joined together by any suitable bonding technique such as welding, brazing, glueing or reactive bonding, or any combination thereof, for electrical contacting and/or sealing.

The proposed fuel cell stack 103 includes according to a preferred application between 1 and 100 unit cells 50, corresponding to 16-5000 W nominal electrical power.

Figure 3:
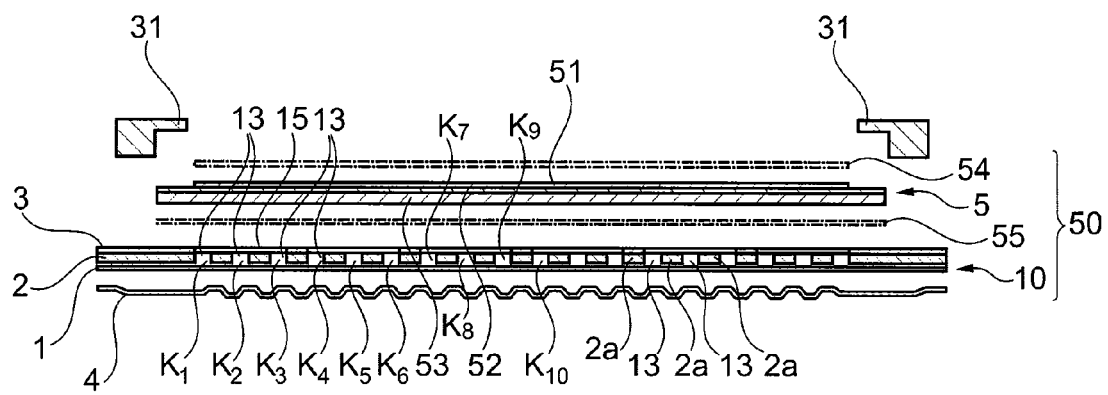

The embodiment shown in FIG. 3 shows a sectional view of an arrangement of a unit cell 50 comprising a cathode-anode-electrolyte unit 5 and a gas distribution element 10 according to a second embodiment of the invention. The gas distribution element 10 according to the second embodiment shown in FIG. 3 is composed of a base layer 1, a second layer 3 and a first layer 2. The first layer 2 also contains apertures; however the section is laid in such a manner that the cut out portions of the apertures are not visible in FIG. 3. The cathode-anode-electrolyte unit 5 is composed of a first electrode 51, a second electrode 53 and an electrolyte 52 sandwiched between the first and second electrodes 51, 53. The unit cell 50 further comprises lateral seals 31, which provide a gas tight seal for the edges of the cathode-anode electrolyte unit 5 and the contacting layers 55 and the gas distribution element 10. In a further embodiment the unit cell 50 may also comprise a supporting layer 4 for supplying the first reactant fluid containing oxygen to the first electrode 51. The second reactant fluid comprising the fuel is supplied to the second electrode 53 above the first layer 2 respectively the second layer 3.

Figure 4:
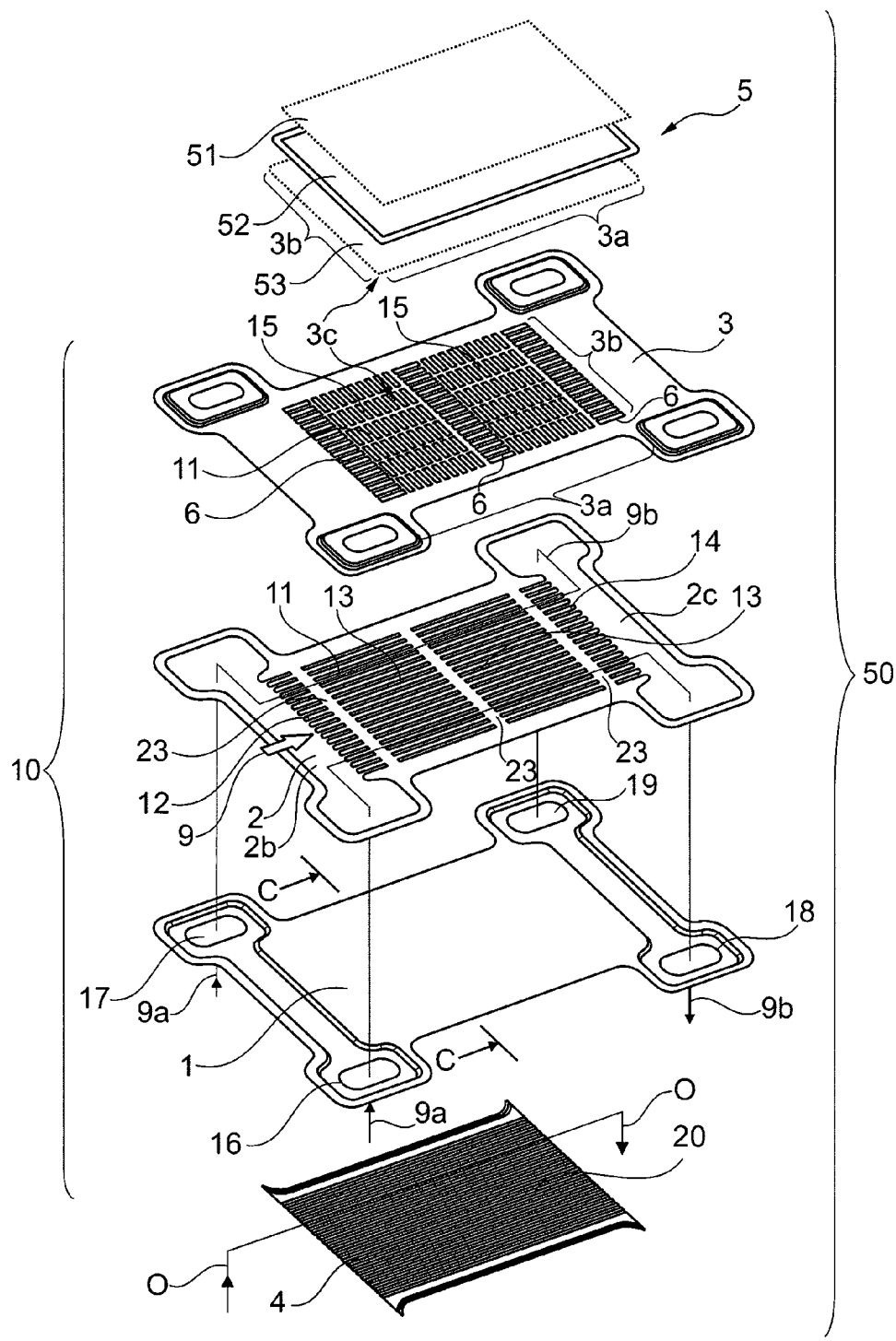

FIG. 4 shows an explosion view of a gas distribution element 10 and a cathode-anode-electrolyte unit 5 according to a third embodiment of the invention. The cathode-anode-electrolyte unit 5 is composed of a first electrode 51, a second electrode 53 and an electrolyte 52 sandwiched between the first and second electrodes 51, 53. Usually a ceramic gas diffusion layer 54,55 is arranged on both sides of the electrodes 51,53, which is not shown in FIG. 4, but which for example is shown in FIG. 8A.

The gas distribution element 10 for a fuel cell 50 or an electrolyzing device comprises a base layer 1, a first layer 2 and a second layer 3; said first 2 and second layers 3 are disposed with a gas distribution structure 11 forming pattern for a fluid flow. The first layer 2, disclosed in FIG. 4, defines a flow pattern by a number of channels 13 laying one beside the other, so that the combustible gas entering the first layer 2 may flow in the main direction of flow 9. The channels 13 extend in linear direction. The channels 13 preferably start on one side of the first layer 2 at an entrance side 2b, also called inlet, and the channels 13 preferably end on the other side of the first layer 2, at the exit side 2c, also called outlet, whereby the entrance side 2b is connected with a combustible gas supply 9a, and whereby the outlet 2c is fluidly connected to an exhaust gas exit 9b. In FIG. 3 a sectional view of the gas distribution element 10 along line C-C can be seen. The first layer 2 comprising a plurality of spaced channel bars 2a forming channels 13 there between. As disclosed in FIG. 4 the first layer 2 may comprise further channels 12, 14 extending in linear direction, and which fluidly connect the channels 13 with the inlet 2b respectively the outlet 2c.

The second layer 3 is a homogenizing element comprising apertures 15 which fluidly connect at least two channels 13 laying one beside the other, to compensate and to homogenize the amount of fluid in the respective channels 13. In FIG. 3 an aperture 15 is disclosed fluidly connecting three channels 13. The second layer 3 has first apertures 15 which are configured as rectangular openings having a length 28 and a width 29. The length is greater than the width. The length 28 extends transversely to the main direction of fluid flow 9; the width 29 extends in the main direction of fluid flow 9. The second layer 3 may also have second apertures 6 which have a length 7 and a width 8, with the length 7 being greater than the width 8 and the width 8 extending in a transverse direction to the main direction of fluid flow 9.

The first layer 2, also called channel layer, has a plurality of inlet channels 12, a plurality of consecutive channels 13 and a plurality of outlet channels 14. Consecutive channels 12 and 13 are separated by a bar element 23. Consecutive channels 13 and 14 are also separated by a bar element 23. The bar elements 23 are necessary to connect the bars 2a.

These second apertures 6 of the second layer 3 form channel-like structures, which are arranged in particular rectangular or inclined to the inlet channels 12 arranged in the first layer 2. This has the advantage, that the fluid flowing inside the channels 12, 13, 14 of the first layer 2 may be directed by a bar element 23, which is part of the first layer 2, arranged on the first layer towards the aperture 6 of the second layer 3, as disclosed in FIG. 2. The aperture 6 thus forms a fluid passage between consecutive channels 12 and 13, or between consecutive channels 13 and 13, or between consecutive channels 13 and 14 by traversing the bar element 23 trough aperture 6. Whenever the fluid flows over the bar element 23 it enters the aperture 6 above the bar element 23 and is distributed into a consecutive channel 13, respectively 14. One advantage of such an embodiment is that the first layer 2 and the second layer 3 can be manufactured very cheap by using thin metal sheets.

Advantageously each inlet channel 12 is continued with a consecutive channel 13 and an outlet channel 14. These channels 12, 13, 14 may have the same cross-section and may be arranged one behind each other. Advantageously a plurality of inlet channels 12, consecutive channels 13 and outlet channels 14 are foreseen as disclosed in FIG. 4. Each of the inlet channels 12 may be arranged parallel to the corresponding neighboring inlet channel 12, the same may apply also to the consecutive channels 13 or outlet channels 14.

The first layer 2 and the second layer 3 may be formed on separate sheets as shown in FIG. 4; however, they may also be combined into a single sheet. Furthermore the first layer 2 may be manufactured as a sheet having perforations corresponding to the channels 12, 13, 14 and being arranged beside a base sheet 1 forming the base for the channels 12, 13, 14. This solution can be advantageous for the manufacture of the channels. Furthermore a considerable variety of shapes is available for the perforations. The perforations may be conveniently punched out of the sheet, laser cut or also etched or formed as lost inserts that are removed after casting or molding the layer. Thus foreseeing a base layer 1 and the second layer 3 as separate sheets may provide a simplification in manufacture or the application of a greater variety of manufacturing methods to manufacture the layers 1, 2, 3.

Furthermore two inlet openings 16, 17 are provided for the reactant comprising the fuel, which is the combustible gas, to enter the gas distribution element 10. In addition two outlet openings 18, 19 may be provided for the fluid reaction product, which is the waste gas, to leave the gas distribution element 10.

Figure 4A:
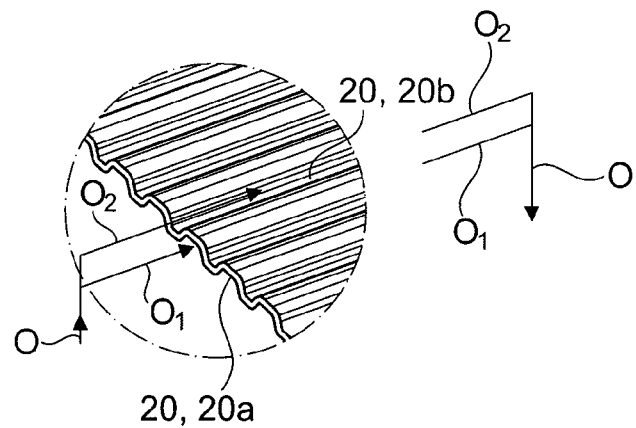

In a further embodiment a supporting layer 4 may be arranged on the side of the base layer 1 or may be connected with the base layer 1. In a preferred embodiment the supporting layer 4 has the shape of a second gas distribution element. FIG. 4 shows the flow path of the oxidizing agent O, the supporting layer having channels 20. FIG. 4A shows an enlarged view of a preferred structure of the supporting layer 4, whereby the flow path of the oxidizing agent O is split in two flow paths O1, O2, so that each path flowing in a channel 20 along one side of the supporting layer 4.

Figure 4B:
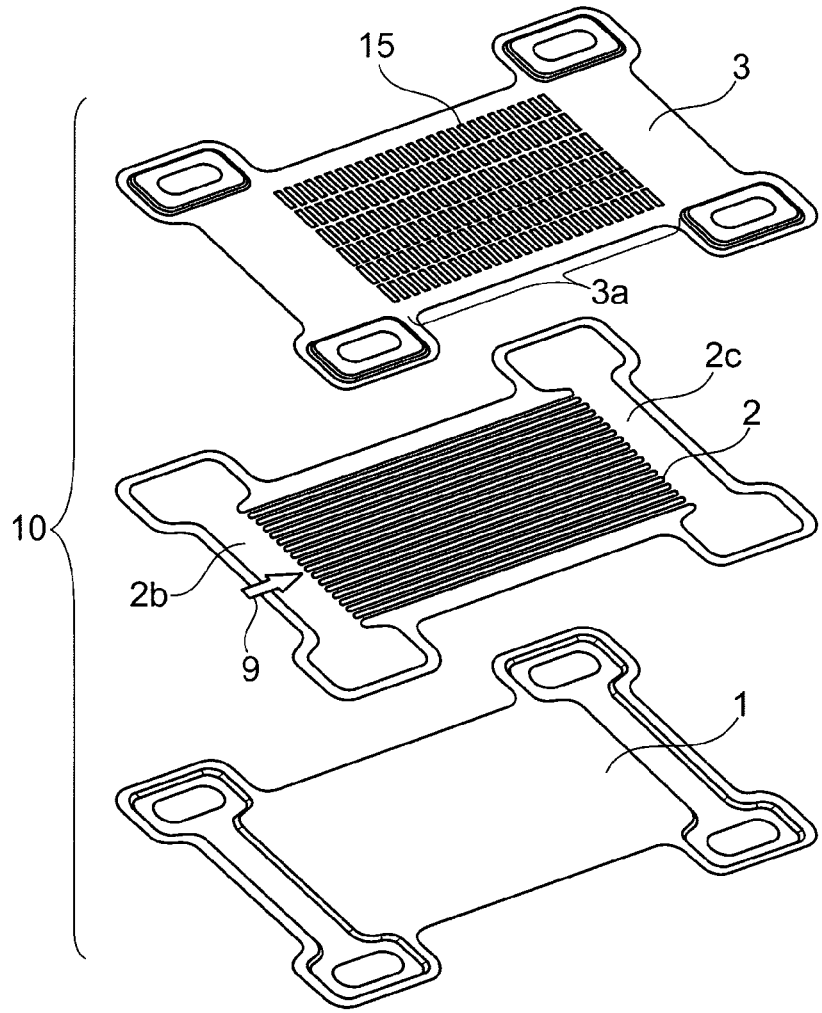

FIG. 4B shows a further embodiment of a gas distribution element 10. The base layer 1 and the first layer 2 defining the flow pattern being made of one single part. In this embodiment there is no need for bar elements 23 holding the bars 2a, because the bars 2a are connected with the base layer 1, so that the plurality of channels 13 extend in linear direction, one beside the other, whereby the channels 13 start at the entrance side 2b and end at the exit side 2c, so that the channels fluidly connect the entrance side 2b with the exit side 2c. Because the bar element 23 are not needed, also the apertures 6 to fluidly connect consecutive channels 12,13,14 are not needed in the second layer 3, as disclosed in FIG. 4B.

Figure 4C:
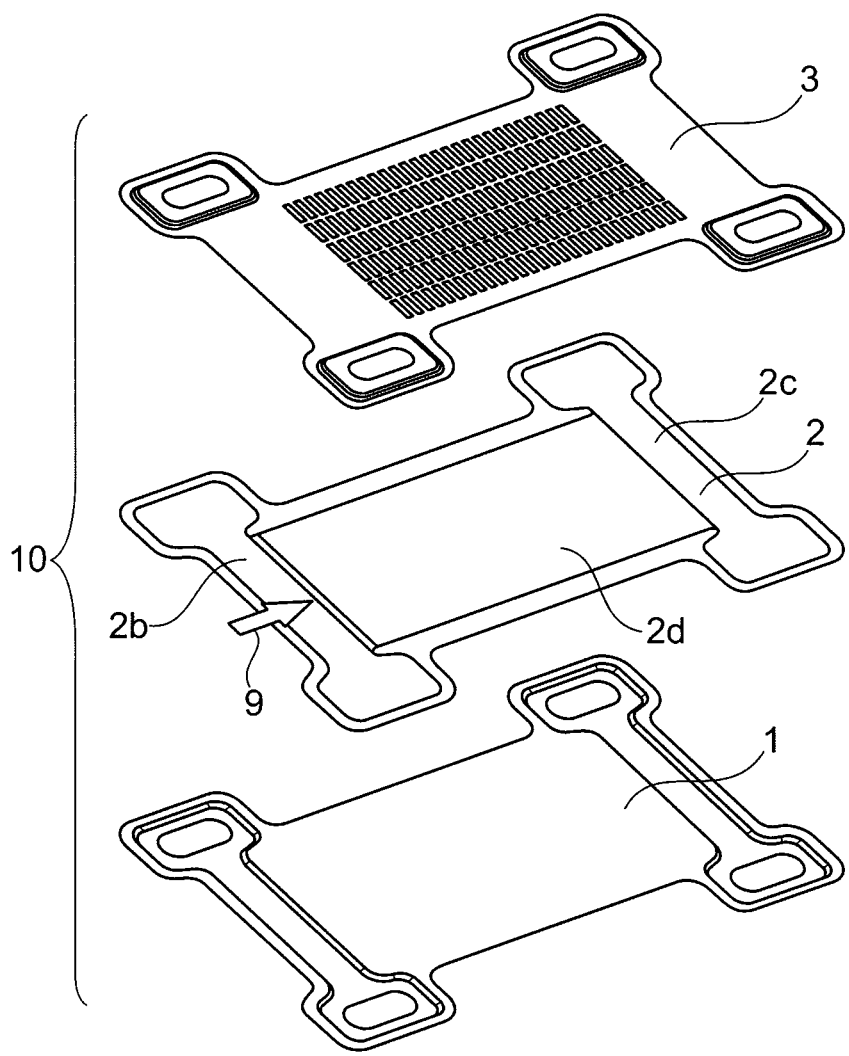

FIG. 4C shows a further embodiment of a gas distribution element 10. The first layer 2 comprises a porous structure 2d, such as a piece of metallic foam or metal mesh, whereby the porous structure being arranged on the base layer 1. The first layer 2 defining a flow path starting at the entrance side 2b and ending at the exit side 2c, so that the porous structure fluidly connects the entrance side 2b with the exit side 2c, so that the porous structure defining a flow path extending in linear direction.

Figure 4D:
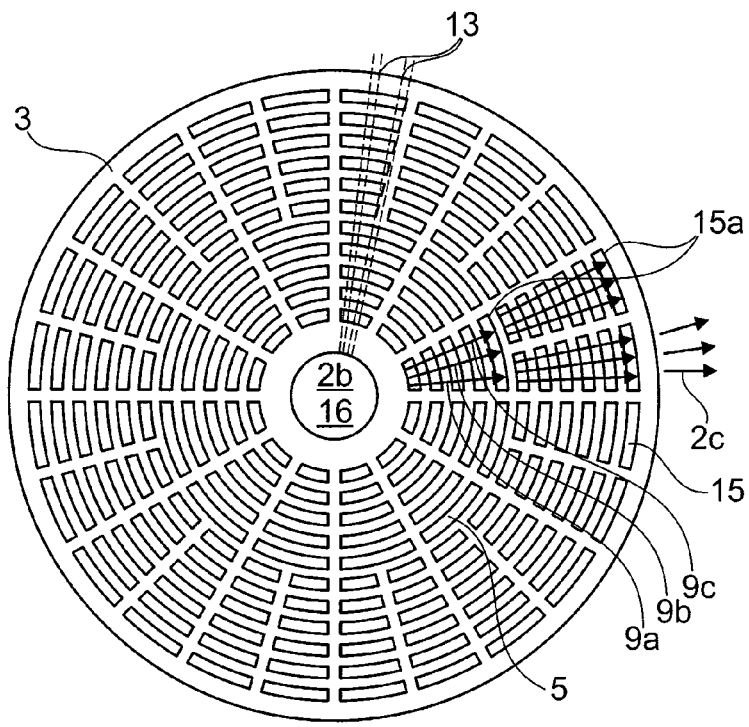

FIG. 4D shows a further embodiment of a second layer 3, a homogenizer element. In contrast to the embodiment disclosed in FIG. 4B, showing a second layer 3 of rectangular shape, FIG. 4D shows a second layer 3 of circular shape. In contrast to the embodiment disclosed in FIG. 4B, showing a first layer 2 of rectangular shape with parallel extending channels 13, a first layer adapted to the second layer 3 disclosed in FIG. 4D would have a circular shape and comprising channels 13 extending linear in radial direction, starting in the center at the fuel inlet 2b, which is at the same location as the fuel inlet opening 16, and ending at the periphery, where a fuel outlet 2c is arranged that preferably totally surrounds the first and second layer 2,3, so that the combustible gas 9a within the gas distribution element 10 flows in radial direction. Only a few of the channels 13 are shown in FIG. 4D. The second layer 3 comprises a plurality of apertures 15 extending in circumferential direction, the apertures 15 transversely crossing the channels 13 of the first layer 2, so that some of adjacent channels 13 are fluidly connected by respective apertures 15. A gas distribution element 10 comprising a first and second layer 2,3 as disclosed in FIG. 4D is therefore of circular shape. To build a circular fuel cell unit 50, a circular cathode-anode-electrolyte unit 5 can be arranged on top of the second layer 3, and a supporting layer 4 could be arranged below the first layer 2, so that a fuel cell unit 50 is achieved, similar to the one disclosed in FIG. 4, but with radially extending channels 13 in the first layer 2, and radially extending channels 20 in the supporting layer 4. The first layer 2 arranged beneath the second laser 3 may also be a three dimensional structure such as pins, grid, mesh structures or foam structures, the first layer 2 having a circular shape and a direction of fluid flow 9a, 9b, 9c extending in radial, in particular in linear direction from an inlet 2b to an outlet 2c, and the first apertures 15 of the second layer 3 extending in circumferential direction. In an advantageous embodiment there are no channels within the foam structure, but the porous structure of the foam allows a fluid to flow within the foam so that the fluid is flowing in a direction of fluid flow 9a,9b,9c within the first layer 2.

Figure 4E:
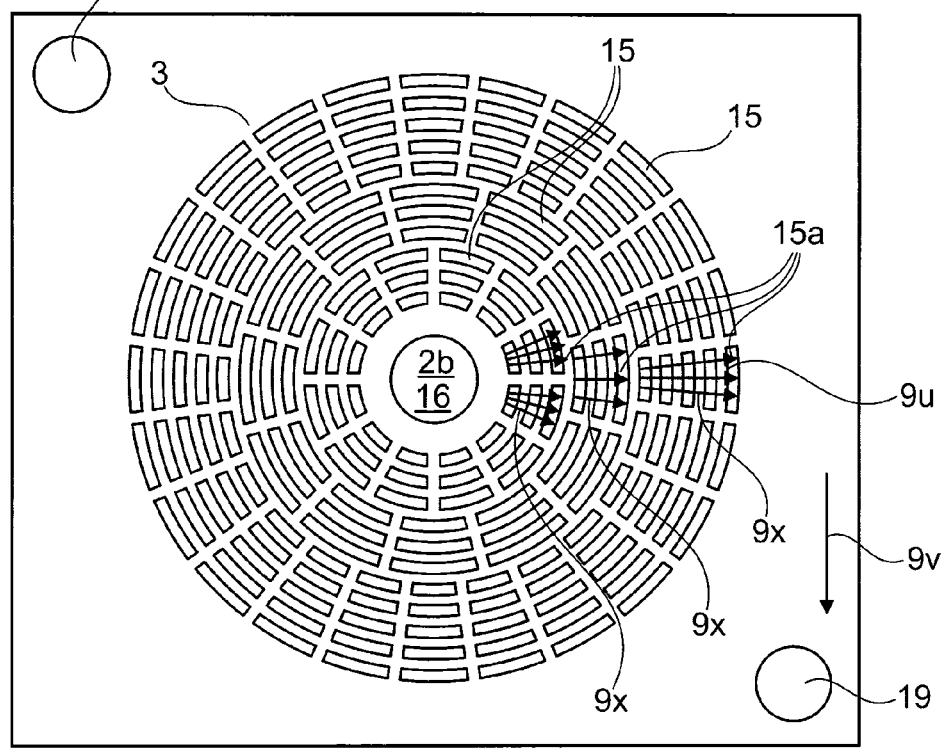

FIG. 4E shows a further embodiment of a second layer 3 of rectangular shape comprising apertures 15 extending in circular direction. In contrast to the second layer 3 disclosed in FIG. 4D, the apertures 15 of the second layer 3 disclosed in FIG. 4E are arranged in three groups 9x of apertures 15 of similar dimensions, whereby these groups 9x are displace respective to each other in circumferential direction. Such an arrangement of apertures 15 increases the homogenizing effect on the flux of the fuel passing the channels 13. The second layer 3 disclosed in FIG. 4E comprises a circumferential fuel outlet 2c collecting the waste gas to the fuel outlet ports 18/19 so that the fuel in the first layer 2 may first flow in radial direction 9u and then in direction 9v to the fuel outlet 2c.

Figure 5:
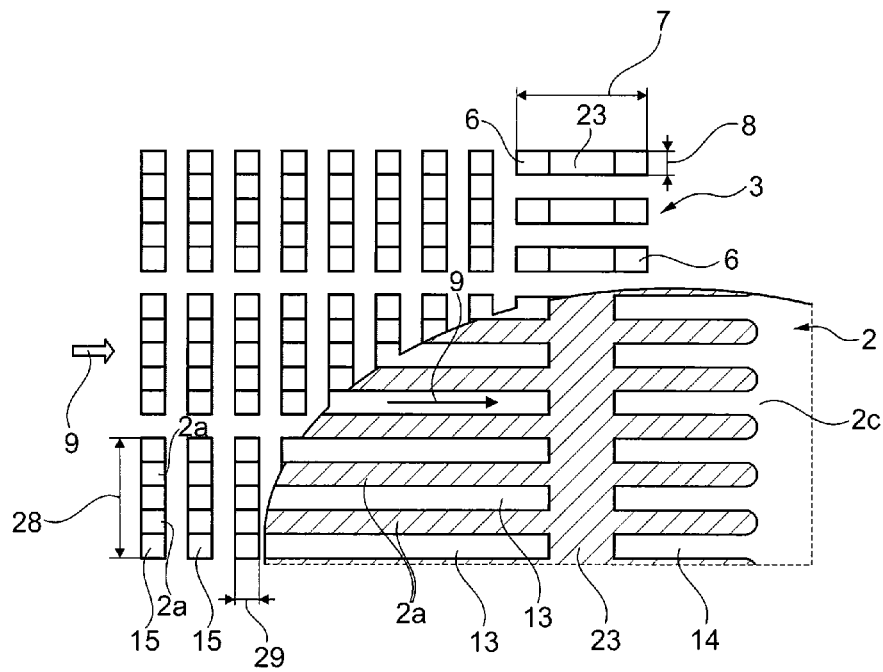

FIG. 5 shows a partial top view of the first and second layers 2, 3 of a gas distribution element 10 of the third embodiment in a view as partial cut from the top side of the gas distribution element 10. The cross sectional view of a portion of the first layer 2 shows some of the channels 13, one beside the other and separated by a channel bar 2a and some of the consecutive outlet channels 14, separated by the bar element 23 from the channels 13. The first layer 2 is arranged behind the second layer 3. The second layer 3 contains first apertures 15 having length 28 and a width 29 with the length 28 extending transverse, in this embodiment perpendicular, to the main direction of fluid flow 9.

Figures 6A, 6B, 6C:
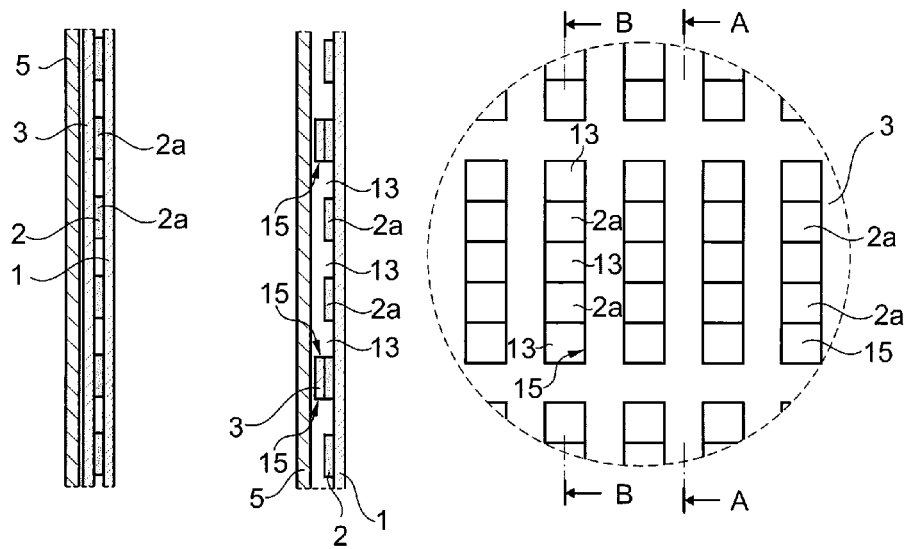

FIG. 6A shows a partial top view of a perforated second layer 3 of a gas distribution layer 10 according to any of the first, second or third embodiments of the invention, comprising first apertures 15 and underlying channel bars 2a. FIG. 6B, a section along line A-A of FIG. 6A, shows the cathode-anode-electrolyte unit 5, the first layer 2 comprising channel bars 2a, the second layer 3 and the base layer 1. The base layer 1 and the first layer 2 are manufactured from distinct sheets. FIG. 6C shows a section along line B-B of FIG. 6A. As a difference to FIG. 6B the section traverses a row of apertures 15, therefore the second layer 3 is interrupted by the apertures 15. Furthermore the parallel extending channels 13 in the first layer 2 are shown.

Figure 6D:
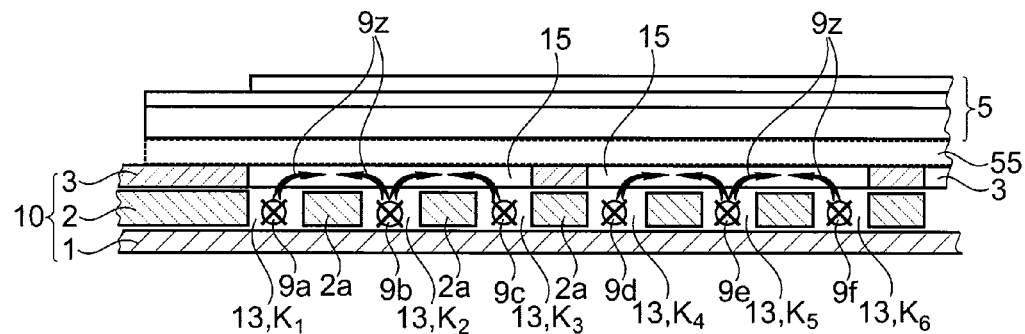

FIG. 6D shows a section along line C-C of FIG. 4, without the supporting layer 4, in detail. The gas distribution element 10 consisting of three layers, the base layer 1, on top of which the first layer 2 is arranged, defining the flow pattern comprising a plurality of channels 13 separated by bars 2a extending parallel in flow direction 9. The second layer 3, which is the homogenizing layer, is arranged on top of the first layer 2. The second layer 3 comprising first apertures 15 extending perpendicular to the flow direction 9. In the embodiment shown, the first apertures 15 extend over three channels 13, to fluidly connect the three channels 13, so that a fluid exchange 9z might take place between the three combustible gas streams 9a, 9b, 9c; 9d,9e,9f and through the first apertures 15. FIG. 6D shows an ideal gas distribution element 10 in that each of the channels 13, K1 . . . K6 have identical width and identical height and identical flow resistance, so that each of the combustible gas streams 9a,9b, 9c,9d,9e,9f have about the same flow rate and about the same gas composition and resulting diffusive flux of reactants and reaction products to the cathode-anode-electrolyte unit 5, so that minor or no fluid exchange 9z between the gas streams 9a,9b,9c;9d,9e,9f takes place within the first apertures 15. In addition to the fluid exchange 9z between the three combustible gas streams 9a, 9b, 9c; 9d,9e,9f as described, the first apertures 15 have also the effect, that within the first aperture 15, which is facing the cathode-anode-electrolyte unit 5, the gas composition leaving the streams 9a,9b,9c; 9d,9e,9f are mixed and homogenized, before entering the cathode-anode-electrolyte unit 5. Therefore the gas composition is homogenized before entering the cathode-anode-electrolyte unit 5, which guarantees that unit 5 is provided with a sufficient amount of reactive gas, even if one or even two of the gas streams 9a,9b,9c; 9d,9e,9f provide not sufficient gas. The cathode-anode-electrolyte unit 5 and the second gas contacting and gas diffusion layer 55 arranged on top of the second layer 3 are only schematically shown.

Figure 6E:
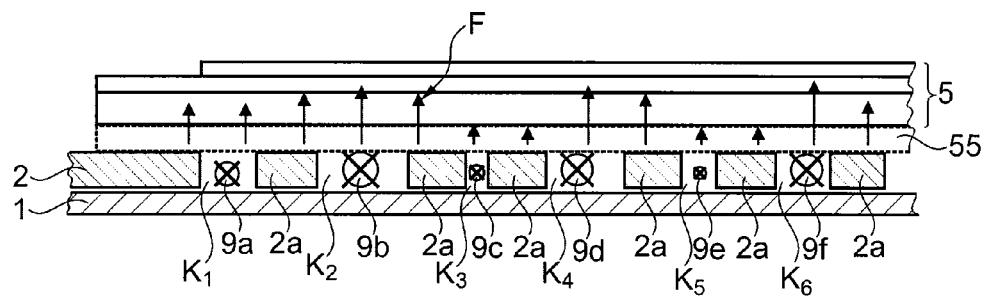
Figure 6F:
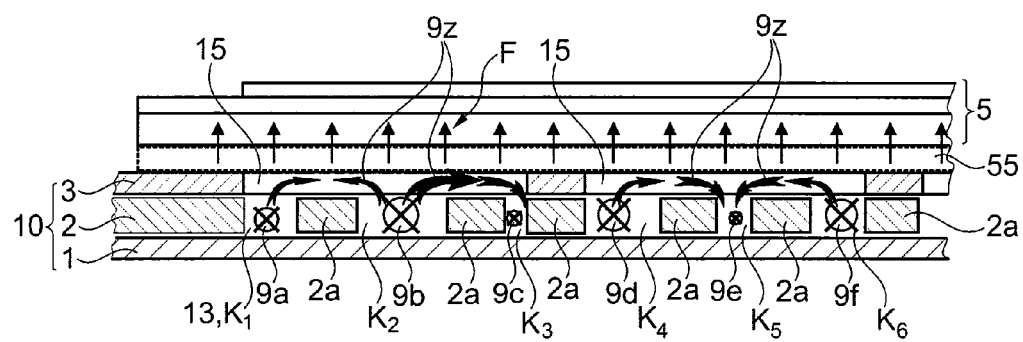

FIG. 6F shows a section along line C-C of FIG. 4 in detail. In contrast to FIG. 6D showing an ideal gas distribution element 10, FIG. 6F shows a common arrangement in which the channels K1 . . . K6 have slightly different shapes, for example a different width, and therefore different flow resistance, which causes the effect, that the gas streams 9a,9b,9c,9d,9e,9f have different flow rates. The advantage of the second layer 3, the homogenizing layer, is, due to the first apertures 15 fluidly connecting some of the channels K1,K2,K3; K4,K5,K6, a fluid exchange 9z occurs between the gas streams 9a,9b,9c,9d,9e,9f so that the difference in flow rate between the gas streams 9a,9b,9c,9d,9e,9f is reduced, which means the gas streams are homogenized, so that the gas composition and resulting diffusive flux of reactants and reaction products of the combustible gas F along the cathode-anode-electrolyte unit 5 is harmonized.

FIG. 6E shows the embodiment according to FIG. 6F, but without the second layer 3. In absence of the homogenizing layer, the gas composition and resulting diffusive flux of reactants and reaction products of the combustible gas F along the cathode-anode-electrolyte unit 5 may strongly vary, depending on the different shapes of the channels K1 . . . K6. One advantage of the second layer 3, the homogenizing layer, therefore is, that the first layer 2 can be manufactures in a cheaper way, because the effect of variances in channel width and/or channel height on the gas streams 9a, 9b, 9c, 9d, 9e, 9f can be compensated by the homogenizing layer, thus allowing to manufacture a cheap and reliable gas distribution element 10.

Figure 6G:
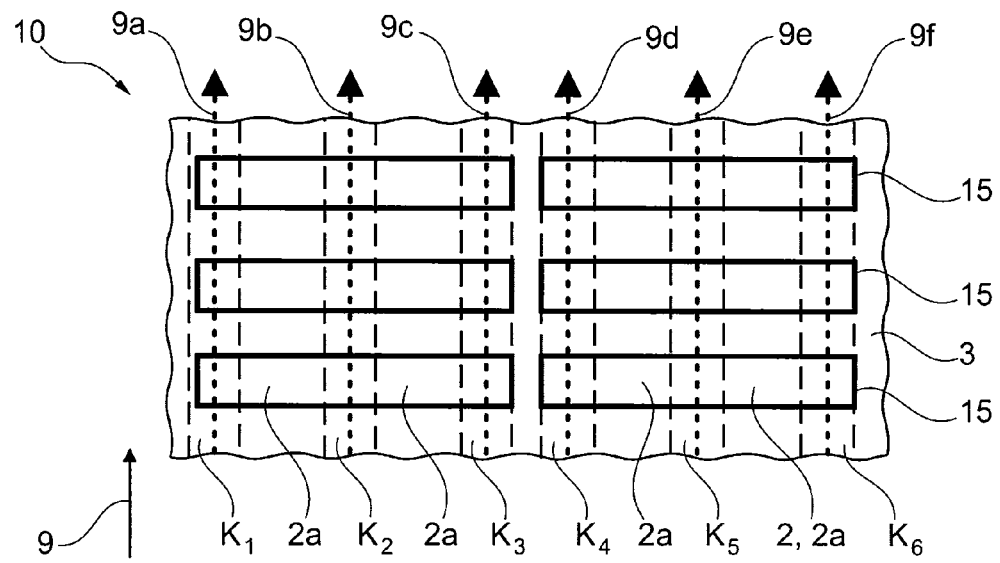

FIG. 6G shows a top view of the gas distribution element 10 disclosed in FIG. 6D, showing six channels K1 . . . K6 extending in parallel direction, three channels K1,K2,K3; K4,K5,K6 being fluidly connected by apertures 15, whereby each of the gas streams 9a,9b,9c,9d,9e,9f have the same flow rate. A plurality of apertures 15 are arranged and spaced apart in flow direction 9.

Figure 6H:
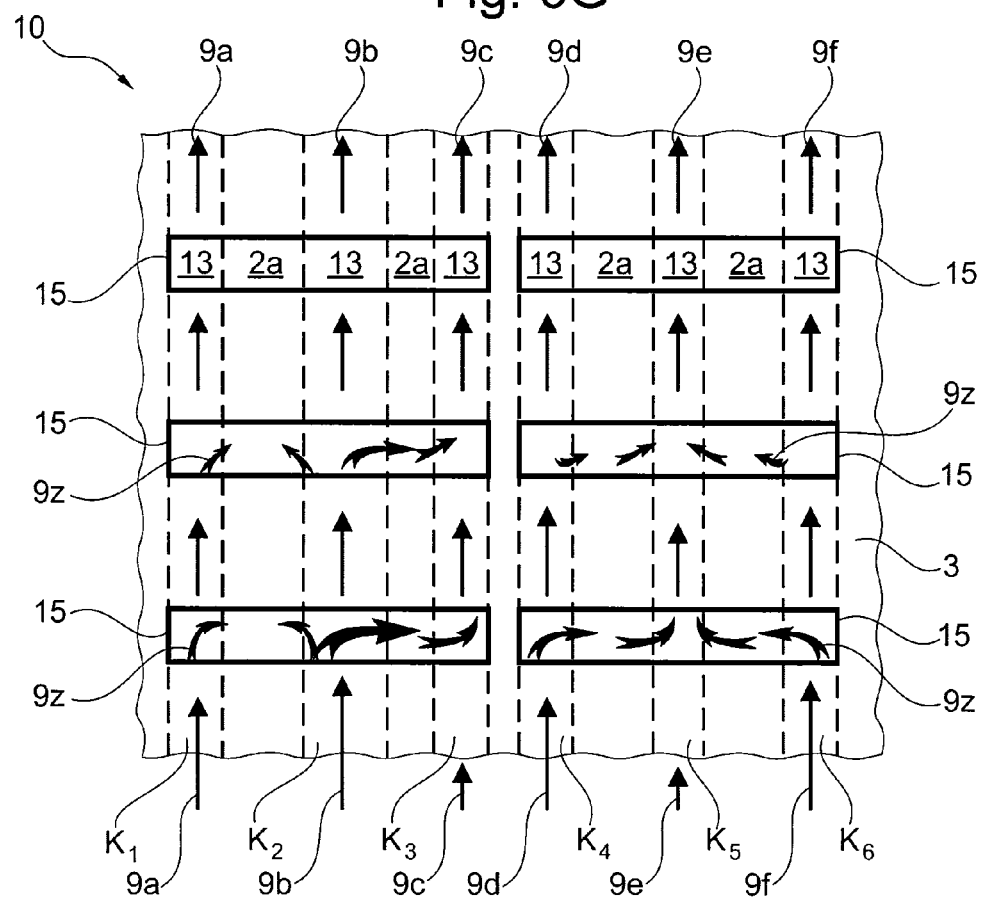

FIG. 6H shows a top view of the gas distribution element 10 disclosed in FIG. 6F, showing six channels K1 . . . K6 extending in parallel direction, three channels K1,K2,K3; K4,K5,K6 being fluidly connected by apertures 15, whereby gas streams 9a,9b,9c,9d,9e,9f entering the gas distribution element 9 have different flow rates. A plurality of apertures 15 are arranged and spaced apart in flow direction 9, whereby in each of the apertures 15 a fluid exchange 9z may occur between the gas streams 9a,9b,9c; 9d,9e,9f so that the difference in flow rate between the gas streams 9a,9b,9c; 9d,9e,9f is reduced. The gas distribution element 10 comprises the apertures 15 therefore ensure that none of the channels K1 . . . K6 is deprived with gas, and that the cathode-anode-electrolyte unit 5 will not suffer from local depletion of fuel. The homogenizing layer 3 therefore has the effect, that damaging of the fuel cell unit 50 due to lack of combustible gas in some areas of the fuel cell unit 50 is avoided. Moreover, in the apertures 15 a homogenization of compositions by diffusion and convection takes place. This reduces further the risk of having one area of the cell damaged by local depletion of combustible gas, even in the event of having one of the channels K1 . . . K6 e.g. clogged by any unwanted residue. In that case, the gases can circumvent the clogged part of channel through the apertures 15 and the gas diffuse through the aperture 15 above the clogged channel to the electrode.

Figure 6I:
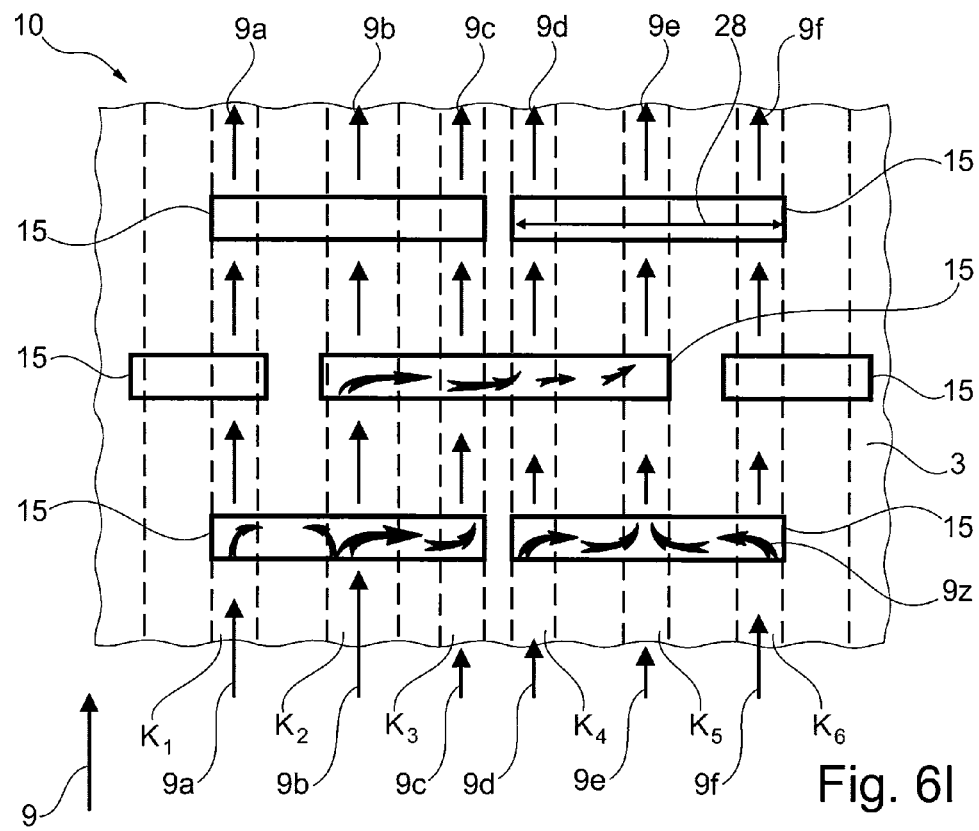

FIG. 6I shows a top view of a further embodiment of a gas distribution element 10, showing six channels K1 . . . K6 extending in parallel direction, the channels K1,K2,K3; K4,K5,K6 being fluidly connected by apertures 15, whereby gas streams 9a,9b,9c,9d,9e,9f entering the gas distribution element 9 have different flow rates. In contrast to the embodiment disclosed in FIG. 6H, the apertures 15 in the embodiment according to FIG. 6I have different length 28, and therefore may fluidly connect two, three, four or even more parallel extending channels K1 . . . K6. In addition, consecutive apertures 15 spaced apart in flow direction 9 may be shifted perpendicular to the direction of flow 9 and/or may have different length 28, therefore connecting different channels K1 . . . K6.

Figure 6K:
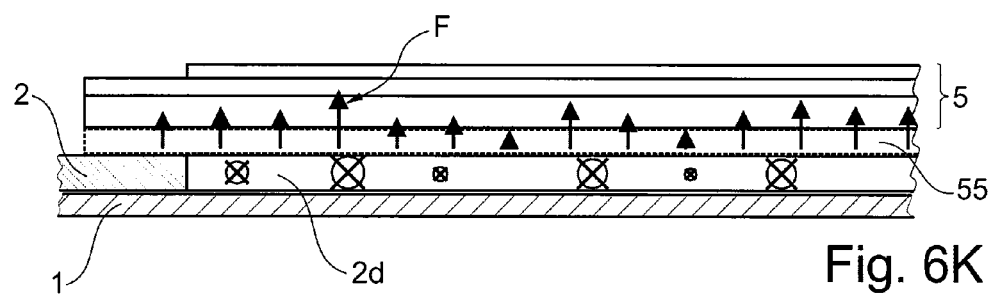
Figure 6L:
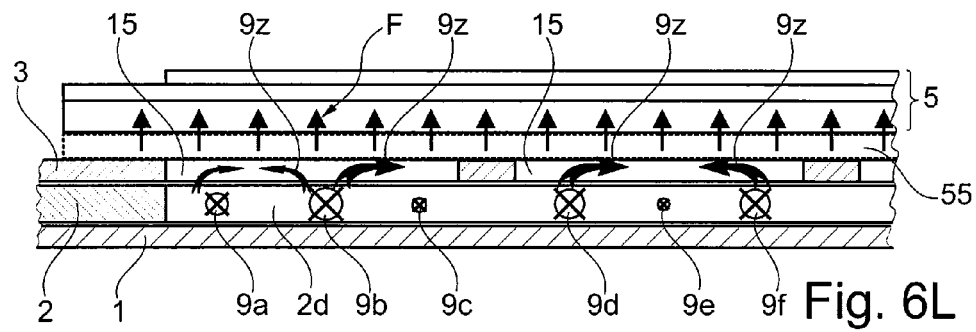

FIG. 6L shows a section along line C-C of FIG. 4C in detail, the first layer 2 comprising a porous structure 2d through which the combustible gas 9 flows. In contrast to the gas distribution element 10 disclosed in FIG. 6F comprising channels K1 . . . K6, the gas flow is more diffuse in the porous layer disclosed in FIG. 6L, therefore the gas streams 9a,9b,9c,9d,9e,9f disclosed in FIG. 6L show only the fuel flow intensity (magnitude) flowing in flow direction 9. The effect of the second layer 3, the homogenizing layer, is similar to the effect disclosed in FIG. 6F, in that the second layer 3 causes a fluid exchange 9z between the gas streams 9a,9b,9c,9d,9e,9f, if the gas streams have different gas composition. Therefore the second layer 3 homogenizes the flow rate of the gas various streams 9a,9b,9c,9d,9e,9f in the porous structure of first layer 2. Therefore the gas composition and resulting diffusive flux of reactants of the combustible gas F along the cathode-anode-electrolyte unit 5 is harmonized.

FIG. 6K shows the embodiment according to FIG. 6L, but without the second layer 3. In absence of the homogenizing layer 3, the gas composition and resulting diffusive flux of reactants of the combustible gas F along the cathode-anode-electrolyte unit 5 may strongly vary, depending on flow resistance in the porous first layer 2, similar to the effect disclosed in FIG. 6E.

Figure 7A:
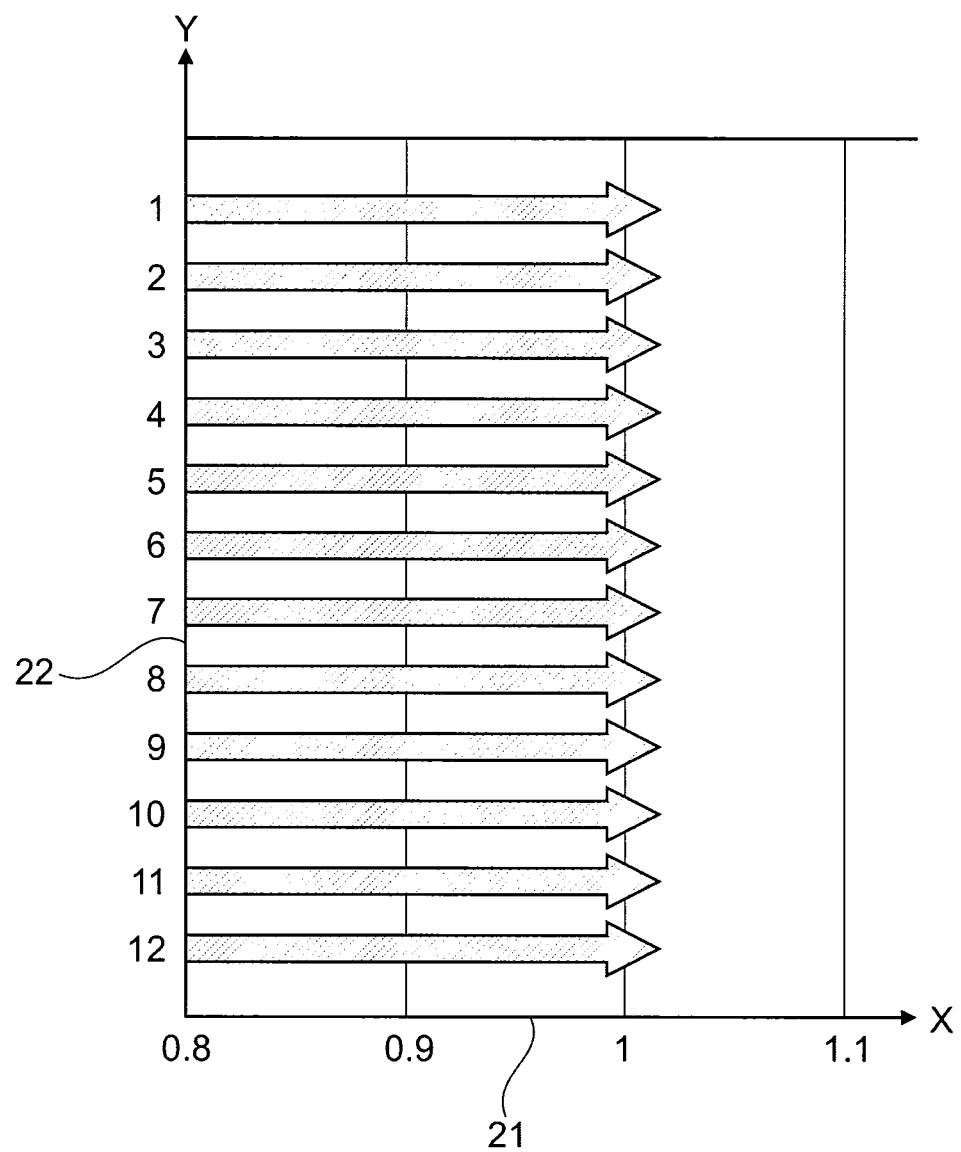
Figure 7B:
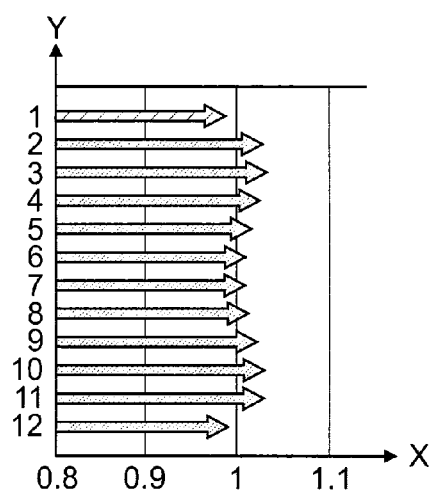
Figure 7D:
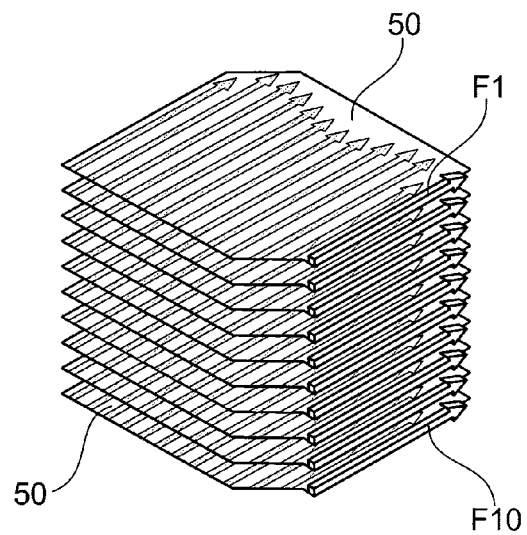

FIG. 7A is a schematic view showing ideal conditions of flow of a combustible gas through a gas distribution layer of a fuel cell unit 50, whereby the fuel cell unit 50 in this example comprises twelve channels 13, laying one beside the other, and whereby the arrows indicate the flux of the combustible gas in the respective channels 13. The x-axis of the coordinate system shows the flux in the respective channel 13 in the main direction of flow 9. The y-axis shows the channel number of twelve channels K1-K12, arranged one beside the other, as indicated in FIG. 3. FIG. 7D shows a stack of ten fuel cell units 50, each fuel cell unit 50 having twelve channels 13, the channel number disclosed in FIG. 7A, 7B corresponds to a channel as shown in the fuel cell stack of FIG. 7D. FIG. 7B is a schematic view showing optimal real conditions of flow of the combustible gas through a fuel cell unit 50, whereby, due to construction compromises in the gas manifolding, the flux of combustible gas is lower on the lateral channels 1 and 12 close to the casing, thus the flow velocity close to the casing of the fuel cell unit 50 having the lowest value.

FIG. 7D is a view on a stack of fuel cell units 50, with each fuel cell unit 50 having an identical flow according to conditions shown in FIG. 7B. Therefore, the average flux F1 to F10 of each of the ten fuel cell units 50 is the same.

Figure 7C:
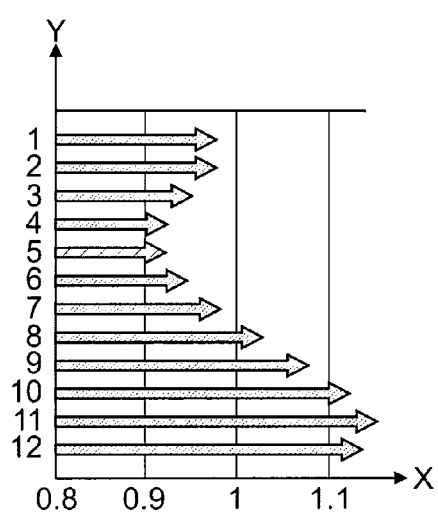

FIG. 7C is a schematic view showing real conditions of flow of the combustible gas through a fuel cell unit according to the prior art, thus a very inhomogeneous distribution of flow velocity. The inhomogeneous distribution of flow velocity occurs for example from production tolerances when manufacturing the fuel cell unit 50. FIG. 7C shows the same designed flow field as in FIG. 7B, but with important deviations from the designed due to for example manufacturing tolerances. This is a typical problem in prior art. The deviations are different from one distribution element to another, depending on its manufacturing. In the example disclosed in FIG. 7C the channel having the lowest gas flux is the number 5, but it can be any other channel in another distribution element. This minimum flux may lead to local fuel starvation and consequently to performance limitations, to local overheating of the fuel cell stack , or even to cracks in the electrolyte, anode or cathode materials, leading possibly to a breakage of the CAE unit 5 and possibly to fuel and oxidant mixing and parasitic combustion, thus a premature severe damage of the stack or at least of parts thereof.

Figure 7E:
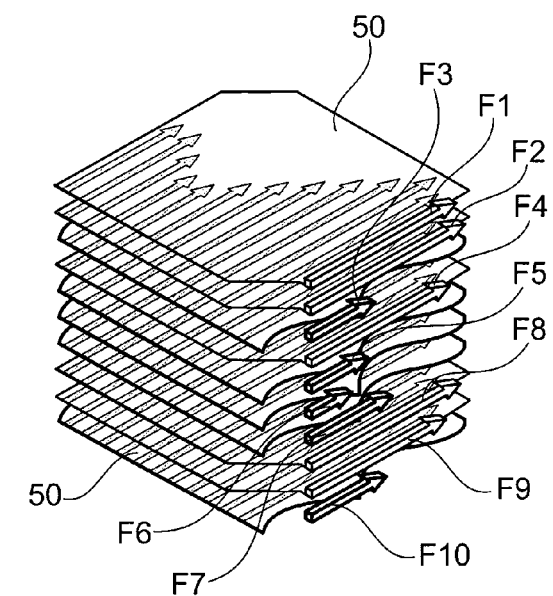

FIG. 7E is a view on a fuel cell stack comprising ten fuel cell units 50 as disclosed in FIG. 7C. The individual fuel cell units 50 present random deviations, with the location of the minimum channel flow varying from one to another, therefore the average flow velocity in each of the fuel cell units 50, indicated by the length of arrows F1 . . . F10, is randomly distributed. These random deviations have a twofold effect: first, the total flux per fuel cell unit varies among units 50 due to different resistances to the fluid flow, and second, the hence cumulated deviation from an average flux per channel (7A, ideal case) becomes consequently more important. For this reason, in prior art, compensations have to be introduced, by correcting the entering flow at the unit cell manifold, by sorting out batches of unit cells with narrow pressure drops, by increasing the specifications for tolerances, or further by reducing the fuel conversion rate to reduce the operational risk. All this has an effect on costs on the production of the stack and on the efficiency of the system. Moreover, FIG. 7E shows that in fuel cell stacks according to the prior art, the flow conditions in neighboring fuel cell units 50, respectively the flow conditions in neighboring gas distribution elements 10 may vary significantly.

Modeling and experimental work on solid oxide fuel cells has shown how important the homogeneity of the fuel distribution and the arrangement of flows are for the performance and reliability of fuel cells. FIG. 7A represents such an ideal case for air and fuel flowing in the same or in the opposite direction. Due to fabrication processes, some compromises are often required, which result in gas distributions that slightly differ from the ideal case as shown in FIG. 7B. The most recent research includes the study of the effect of fabrication tolerances or non-ideal component properties on performance and reliability, thus allowing assessing the suitability of industrial processes or specific designs for the desired performance and reliability.

The work made by Cornu and Wuillemin (Impact of random geometric distortions on the performance and reliability of an SOFC (2011) Fuel Cells, 11 (4), pp. 553-564) shows in particular how the quality of fuel distribution depends on the tolerances of the depth of the channels in the gas distribution structures. The depth of the channels ranges usually from 0.2 mm to the 1-2 mm scale, and their width vary more often from 1 to 2 mm. Depths in the range of 0.5 mm are often found. In such cases, depth variations of 0.05 mm around the targeted value already have a very important impact on flow distribution. An example of such deviation is given in FIG. 7C. Even if depth variations of 0.05 can be achieved by appropriate fabrication techniques, the space between the cathode-anode-electrolyte unit 5 and gas distribution element 10 can also vary depending on the contact layers used in between. The cumulated depth variations for the effective channel sections are therefore very difficult to maintain in the above-mentioned range of deviations. Last, but not least, the contacting layers or channels may creep with time, which will in any case lead to a poor fuel distribution with time.

As unit cells 50 are stacked on top of each other, the defects of the individual elements will cumulate, leading to an even increased deviation of flows in operation which is shown by the case of FIG. 7E.

As exactly the same amount of fuel is converted in all unit cells 50 of the fuel cell stack, thus a common current flow is obtained, so that the areas of the unit cells 50 presenting a low fuel flow are exposed to the risk of fuel starvation when the fuel conversion is increased. As a large conversion is required to reach high performance, a poor fuel distribution will lead to performance limitations or to the damaging of one unit cell due to fuel starvation.

As there is hardly any sign for the operator that part of the fuel cell stack is suffering from starvation unless it is already too late, this kind of problem is of large importance from an industrial and operative point of view.

Figure 8:
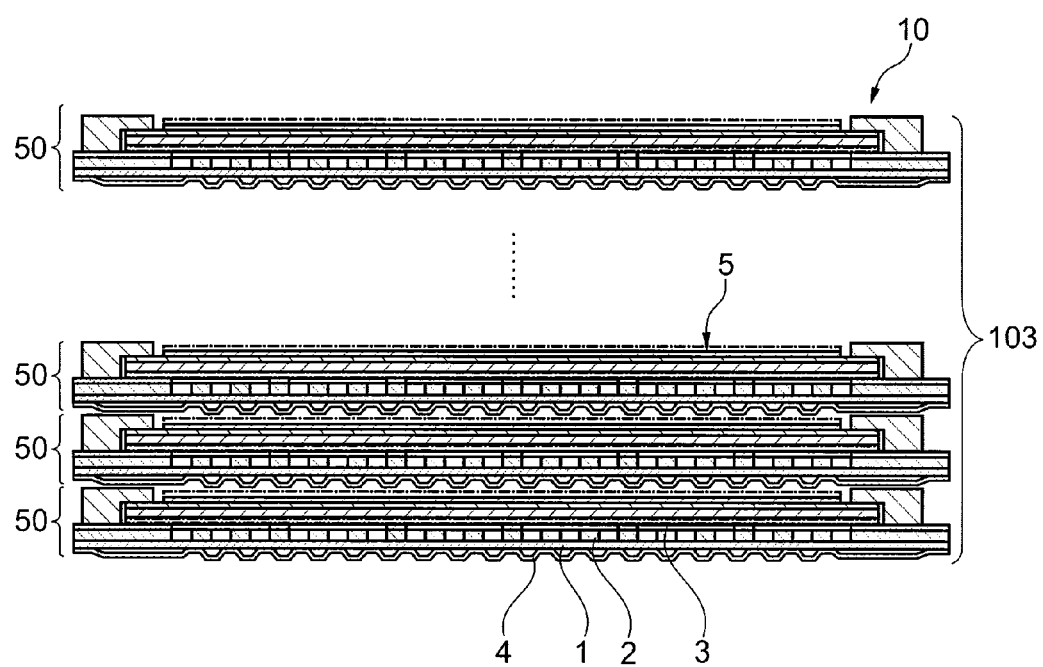
Figure 8A:
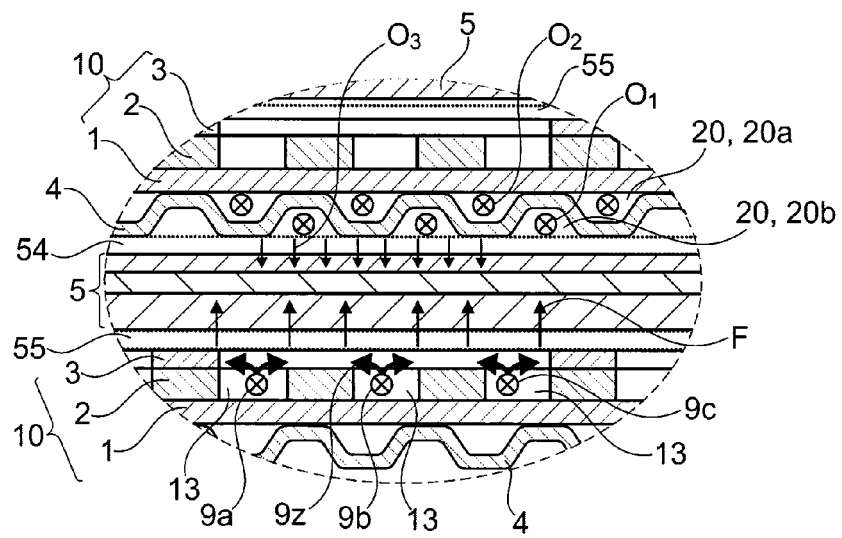

FIG. 8 is a section though a plurality of consecutive fuel cell units 50 forming a fuel cell stack 103, each fuel cell unit 50 comprising a gas distribution element 10 and a supporting layer 4 in accordance with the embodiment as shown in FIG. 4.

Thus, the cross-section of the fuel channels 13 is given and determined by the geometry of the channel structure of the first layer 2 and the second layer 3 being a perforated plate. The second layer 3 being a homogenizing element. Any optional additional contacting layer used between the latter and the cathode-anode-electrolyte unit 5 will have no influence on the flow. Moreover, the geometry of holes 15 on the perforated plate, the second layer 3, allows a fluid exchange and mixing of the fluid along the fluid path of several channels 13, the channels 13 laying one beside the other along the fuel path, hence creating near-isobars among channels at those locations, and hence creating suitable average flux among channels 13. Thanks to this, any deviation of geometry in any channel 13 along the fluid flow path of the combustible gas within the gas distribution element 10 is corrected by allowing the combustible gas to flow between adjacent channels 13, hence using the averaging effect to homogenize the respective reactant respectively combustible gas fluid flow.

FIG. 8A is a detailed section view of FIG. 8 showing two gas distribution elements 10 with corresponding supporting layers 4 in detail. One cathode-anode-electrolyte unit 5 can be seen in the middle of FIG. 8A, whereby a supporting layer 4 is contacting the first gas contacting and gas diffusion layer 54 on top of the cathode-anode-electrolyte unit 5, and whereby the second layer 3, the homogenizing layer, is contacting the second gas contacting and gas diffusion layer 55 on the bottom of the cathode-anode-electrolyte unit 5. The second layer 3 providing first apertures 15 extending over three channels 13, to fluidly connect the three channels 13, so that a fluid exchange 9z homogenizes the combustion gas F entering the cathode-anode-electrolyte unit 5.

The supporting layer 4 has a corrugated shape, that allows to split the flow path of the oxidizing agent O into two separate flow paths O1, O2, the flow paths O1 being the oxidizing agent providing the cathode-anode-electrolyte unit 5 with the oxidizing agent O3. The flow path O2 serves as a cooling agent to cool the base layer 1 and/or the cathode-anode-electrolyte unit 5.

Figure 8B:
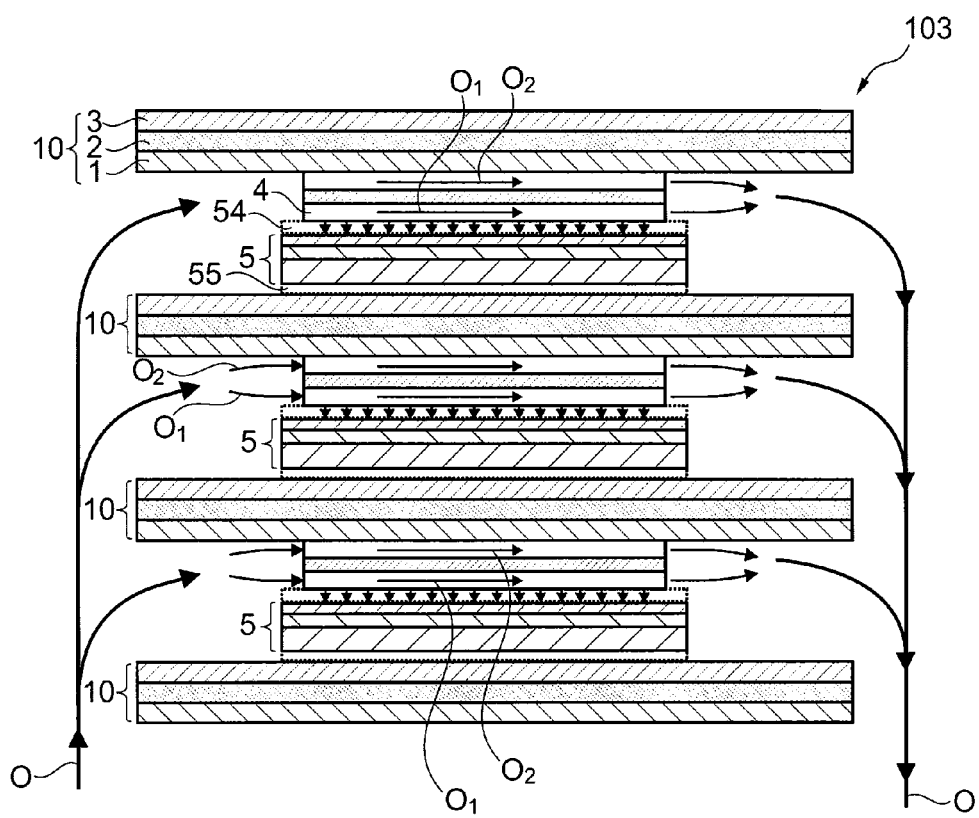

FIG. 8B shows in a section view a schematic side view of a fuel cell stack 103 comprising four gas distribution elements 10 and three cathode-anode-electrolyte units 5 as well as a corresponding supporting layer 4 there between. The oxidizing agent O is provided on one side to all of the supporting layers 4, the oxidizing agent O is then split to form two separate flow paths O1, O2 along the supporting layer 4, and the two separates flow paths O1, O2 are combined after leaving the supporting layer 4, and the flow paths of all supporting layers 4 are also combined to one single flow path that exits the fuel cell stack 103.

FIG. 4 shows a cathode-anode-electrolyte unit 5 having a length 3a and a width 3b, which defines a contacting surface 3c through which the cathode-anode-electrolyte unit 5 contacts the second layer 3. The second layer 3 comprises the same contacting surface 3c. The first apertures 15 of the second layer 3 are arranged within the contacting surface 3c. In a preferred embodiment the total area of all first apertures 15 is at least 20% of the total area of the apertures 15, 6 and others found within the surface 3c. To provide an even more equal distribution of the combustible gas along the contacting surface 3c, in a more preferred embodiment the total area of all first apertures 15 is at least 20% of the contacting surface 3c, and most preferably about 30% and most preferably between 40% to 50%.

The first apertures 15 disclosed are shown with rectangular shape. The first apertures 15 can also have other shapes, such as an elliptic shape. The second layer 3 could also comprise a plurality of first apertures 15 of different shapes, such as for example rectangular and elliptic shapes on the same second layer 3.

An advantageous method for homogenizing a combustible gas in a gas distribution element 10 of a fuel cell is, that the gas distribution element 10 comprises a first layer 2 connecting a fuel inlet 2b with a fuel outlet 2c, whereby the fuel is flowing in a direction of flow 9, within the first layer 2, in particular in linear direction, and the gas distribution element 10 comprises a second layer 3 comprising first apertures 15, the first apertures 15 extending in transverse direction with respect to the direction of flow 9, wherein the combustible gas flowing through the first layer 2 enters the first apertures 15 so that the combustible gas is homogenized within the first apertures 15, and wherein the first apertures 15 are contacting a cathode-anode-electrolyte unit 5, so that the combustible gas from within the first apertures 15 is provided to the cathode-anode-electrolyte unit 5.

In an advantageous method step, at least some of the combustible gas homogenized within the first apertures 15 flows back into the first layer 2.

In a further advantageous method step, the first layer 2 comprises a plurality of channels 13 arranged one beside the other and connecting the fuel inlet 2b with the fuel outlet 2c, the first apertures 15 extending in transverse direction with respect to the channels 13 and fluidly connecting at least two channels 13 arranged one beside the other, wherein the combustible gas, flowing through the respective channels 13, enters the first aperture 15, so that the combustible gas of the respective channels 13 is homogenized within the first aperture 15.

In an advantageous method step at least some of the combustible gas homogenized within the first apertures 15 flows back into the respective channels 13 of the first layer 2 or is exchanged between the respective channels 13 of the first layer 2.

In a further advantageous method step at least some the first apertures 15 extend perpendicular to the direction of flow 9 so that the combustible gas changes the flow direction when flowing through the first apertures 15.

In an advantageous method step at least some the first apertures 15 extend perpendicular to the direction of flow 9 so that the pressure of the combustible gas in the respective first aperture 15 is equalized, so that the pressure of the combustible gas in the underlying first layer 2 or in the underlying respective channels 13 is equalized locally.

The structure was implemented in two stack designs according to U.S. Pat. No. 7,632,586 B2 and validated in operation. A maximum fuel conversion of 94% was attained with efficiencies reaching 61% using hydrogen as fuel and 69% using methane. This is far above earlier results based on the handling of reactant flow as disclosed in U.S. Pat. No. 7,632,586 B2.

The invention claimed is:

1. A gas distribution element for a fuel cell or an electrolyzing device comprising in sequence a base layer, a first layer and a second layer, whereby said first and second layers are disposed with a gas distribution structure forming a pattern for a fluid flow of a first reactant fluid which is a combustible gas, wherein the second layer is a homogenizing element, which has first apertures, wherein the first apertures have a length and a width, with the length being greater than the width, wherein the first layer comprises a fuel inlet and a fuel outlet wherein the main direction of fluid flow extending in linear direction between the fuel inlet and the fuel outlet, that the gas distribution structure of said first layer consisting of a plurality of channels arranged one beside the other, extending linear in the main direction of fluid flow and connecting the fuel inlet with the fuel outlet, that the first apertures, extending in transverse direction with respect to the channels, have such length and are arranged such that at least two channels arranged one beside the other are fluidly connected by the first aperture, and that the second layer comprises a contacting surface to contact a cathode-anode-electrolyte unit, wherein the first apertures are arranged within the contacting surface, and wherein the total surface of all first apertures is at least 20% of the contacting surface.

2. The gas distribution element according to claim 1, wherein the channels extend in parallel to each other, and wherein the first apertures extend perpendicular to the channels.

3. The gas distribution element according to claim 1, wherein the channels extend in radial direction and the first apertures extending in circumferential direction.

4. The gas distribution element according to claim 1, wherein at least some of the channels of the first layer are obstructed by a bar element, the bar element connecting at least two bars which are space apart and form a channel there between, wherein the second layer comprises a plurality of second apertures, wherein the second apertures have a length in the main direction of fluid flow that is greater than the width of the bar element, and the second aperture being arranged beside the bar element to fluidly connect the channel and bypass the bar element.

5. The gas distribution element according to claim 1, further comprising a supporting layer arranged beside the base layer.

6. The gas distribution element according to claim 5, wherein the supporting layer comprises a plurality of channels extending in linear direction, the channels guiding a second reactant fluids, which is an oxidizing agent.

7. The gas distribution element according to claim 6, wherein the supporting layer is a corrugated sheet having channels on both sides, wherein the purpose of the channels facing the first layer is to cool the first layer by the second reactant fluid, and the purpose of the channels on the opposite side is to provide a fuel cell unit with the second reactant fluid.

8. The gas distribution element according to claim 1, wherein the base layer and/or the first layer and/or the second layer and/or or the supporting layer are manufactured by stamping, embossing, punching or etching or by hot pressing.

9. The gas distribution element according to claim 1, wherein the base layer and the first layer or the first layer and the second layer form a monolithic piece.

10. The gas distribution element according to claim 5, wherein the supporting layer forms a monolithic piece with the base layer or the base layer and the first layer.

11. The gas distribution element according to claim 1, wherein the total area of all first apertures is at least 20% of the total area of all apertures located within the contacting surface.

12. The gas distribution element according to claim 9, wherein the base layer and the first layer or the first layer and the second layer are welded together.

* * * * *